US007006318B2

(12) United States Patent
Stence et al.

(10) Patent No.: US 7,006,318 B2
(45) Date of Patent: Feb. 28, 2006

(54) REMOVABLE MEDIA STORAGE SYSTEM WITH MEMORY FOR STORING OPERATIONAL DATA

(75) Inventors: Ronald W. Stence, Austin, TX (US); John P. Hansen, Austin, TX (US)

(73) Assignee: Freescale Semiconductor, Inc., Austin, TX (US)

( * ) Notice: Subject to any disclaimer, the term of this patent is extended or adjusted under 35 U.S.C. 154(b) by 233 days.

(21) Appl. No.: 10/231,868

(22) Filed: Aug. 29, 2002

(65) Prior Publication Data
US 2004/0042112 A1 Mar. 4, 2004

(51) Int. Cl.
G11B 15/18 (2006.01)
(52) U.S. Cl. ...................................... 360/69
(58) Field of Classification Search ................. 360/69, 360/78.04; 711/4, 102, 103, 156
See application file for complete search history.

(56) References Cited

U.S. PATENT DOCUMENTS

| 5,197,026 | A |   | 3/1993  | Butler |
|-----------|---|---|---------|--------|
| 5,269,019 | A |   | 12/1993 | Peterson |
| 5,376,965 | A | * | 12/1994 | Nagasaki et al. ........ 348/231.4 |
| 5,396,617 | A |   | 3/1995  | Villwock |
| 5,448,429 | A | * | 9/1995  | Cribbs et al. ................. 360/75 |
| 5,587,951 | A |   | 12/1996 | Jazayeri |
| 5,654,566 | A |   | 8/1997  | Johnson |
| 5,675,778 | A |   | 10/1997 | Jones et al. |
| 5,701,450 | A |   | 12/1997 | Duncan |
| 5,825,708 | A |   | 10/1998 | Bennett |
| 5,883,749 | A |   | 3/1999  | Park |
| 5,898,165 | A |   | 4/1999  | Kinugasa |
| 5,907,717 | A |   | 5/1999  | Ellis |
| 5,951,691 | A |   | 9/1999  | Ng et al. |
| 5,978,257 | A |   | 11/1999 | Zhu |
| 6,016,530 | A | * | 1/2000  | Auclair et al. .................. 711/6 |
| 6,025,971 | A |   | 2/2000  | Inoue et al. |
| 6,054,825 | A |   | 4/2000  | Hayner |
| 6,085,299 | A | * | 7/2000  | Angelo et al. .............. 711/163 |
| 6,225,933 | B1 |  | 5/2001  | Salter et al. |
| 6,233,171 | B1 |  | 5/2001  | Youm |
| 6,252,471 | B1 |  | 6/2001  | Salter et al. |
| 6,252,795 | B1 |  | 6/2001  | Hansen et al. |
| 6,272,040 | B1 |  | 8/2001  | Salter et al. |
| 6,298,016 | B1 |  | 10/2001 | Otsuka |

(Continued)

FOREIGN PATENT DOCUMENTS

EP    1 037 211 A2    9/2000

OTHER PUBLICATIONS

Fahey, Jonathan; *Total Recall*; Forbes.Com—Magazine Article; Apr. 30, 2001; 2 pages; http://www.forbes.com/global/2001/0430/054. print.html; Printed Aug. 20, 2002.

(Continued)

*Primary Examiner*—David Hudspeth
*Assistant Examiner*—Fred F. Tzeng
(74) *Attorney, Agent, or Firm*—David G. Dolezal; Robert L. King

(57) ABSTRACT

A removable media data storage system with a memory for storing operational data regarding a removable media. In some examples, the operational data stored includes utilization data and/or system data. In some embodiments, the operational data is stored in a non-volatile IC based memory such as e.g. MRAM. In some examples, the memory can store multiple sets of operational data with one set for each removable media that has been inserted into the data storage system. The data system may include a processor operably coupled to the memory, wherein the memory and processor are located on a circuit board in the data system housing.

16 Claims, 12 Drawing Sheets

U.S. PATENT DOCUMENTS

| | | | |
|---|---|---|---|
| 6,314,020 B1 | 11/2001 | Hansen et al. | |
| 6,330,626 B1 | 12/2001 | Dennin et al. | |
| 6,330,648 B1 * | 12/2001 | Wambach et al. | 711/163 |
| 6,381,171 B1 | 4/2002 | Inomata | |
| 6,424,486 B1 | 7/2002 | Heaton et al. | |
| 6,430,660 B1 | 8/2002 | Kemp et al. | |
| 6,462,992 B1 | 10/2002 | Harari et al. | |
| 6,496,406 B1 | 12/2002 | Kitagawa | |
| 6,502,174 B1 | 12/2002 | Beardsley | |
| 6,515,908 B1 | 2/2003 | Miyawaki | |
| 6,597,049 B1 | 7/2003 | Bhattacharyya | |
| 6,621,731 B1 | 9/2003 | Bessho | |
| 6,646,948 B1 | 11/2003 | Stence | |
| 6,681,287 B1 | 1/2004 | Chan | |
| 6,707,628 B1 | 3/2004 | Osaki | |
| 6,743,641 B1 | 6/2004 | Yates | |
| 6,748,524 B1 * | 6/2004 | Stepp et al. | 713/1 |
| 6,751,073 B1 | 6/2004 | Hasegawa | |
| 6,757,694 B1 * | 6/2004 | Goodman et al. | 707/104.1 |
| 6,771,446 B1 * | 8/2004 | Noble | 360/60 |
| 6,779,168 B1 * | 8/2004 | Hamlin | 716/16 |
| 6,782,458 B1 * | 8/2004 | Noble | 711/163 |

OTHER PUBLICATIONS

Lammers, David; *The Promise of MRAM*; EE Times; Jul. 8, 2002; 2 pages; http://www.eetimes.com/story/OEG20020708S0017; Printed Jul. 18, 2002.

Johnson, R. Collin; *Nanoscale Metal Deposition Eyed For MRAMs*; EE Times, Aug. 19, 2002; 2 pages; http://www.eetimes.com/story/OEG20020819S0046; Printed Aug. 23, 2002.

Wong, May; *Unheralded Hard Drives A Catalyst For Better Gadgets*; Austin American-Statesman; Monday, Jul. 29, 2002; Business Section; p. E5.

PCT Search Report PCT/US03/024184 mailed Dec. 11, 2003.

* cited by examiner

REMOVABLE MEDIA STORAGE SYSTEM WITH MEMORY FOR STORING OPERATIONAL DATA

BACKGROUND OF THE INVENTION

1. Field of the Invention

This invention relates in general to the storage of data and in particular to the storage of data in removable media data storage units.

2. Related Applications

This application is related to U.S. patent application Ser. No. 10/230,690 entitled "Hard Disk System With Non-Volatile IC Based Memory For Storing Data" having inventors Ronald W. Stance and John P. Hansen, having an assignee of Freescale Semiconductor Inc., and having a filing date of Aug. 29, 2002, which is hereby incorporated by reference in its entirety.

This application is related to U.S. patent application Ser. No. 10/230,788 entitled "Data Storage System Having A Non-Volatile IC Based Memory For Storing User Data" having inventors Ronald W. Stence, John P. Hansen, and David A. Hayner, having an assignee of Freescale Semiconductor Inc., and having a filing date of Aug. 29, 2002, which is hereby incorporated by reference in its entirety.

This application is related to U.S. Pat. No. 6,646,948 entitled "Data Storage System Utilizing A Non-Volatile IC Based Memory For Reduction Of Data Retrieval Time" having inventors Ronald W. Stance and John P. Hansen, having an assignee of Freescale Semiconductor Inc., and having a filing date of Aug. 29, 2002, which is hereby incorporated by reference in its entirety.

3. Description of the Related Art

Data storage media are used for the storage of data. Examples of data storage media include integrated circuit based storage media such a magno resistive random access memory (MRAM), dynamic random access memory (DRAM), static random access memory (SRAM), flash memory, electrically erasable programmable read only memory (EEPROM), erasable programmable read only memory (EPROM), read only memory (ROM), random access memory (RAM), and programmable read only memory (PROM). Examples of non integrated circuit based media include magnetic based storage media such as magnetic hard disks, tape, and floppy disks; optical based systems such as compact disk (CD) and digital video disk (DVD); and magneto-optic media. The non IC based memory types set forth above are mechanical in nature in that they require a mechanical operation (e.g. rotating a disk, moving a tape) to retrieve the data.

The data access time for IC based media is typically significantly faster than the access time for non IC based media. However, the cost per bit of data storage for non IC media is typically significantly less than that of IC based media. Accordingly, non IC based media are typically utilized for the "mass storage" of data.

The access time limitations utilizing non IC based media can reduce the operating efficiency of a system utilizing the media. What is needed is a system to improve the operating efficiency of non IC based media.

Furthermore with respect to removable media storage units, data that used for accessing data from a removable media is typically not non-volatilely stored in the removable media data storage system once the removable media is removed. Consequently, such information must be reaccessed when the removable media is reinserted.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
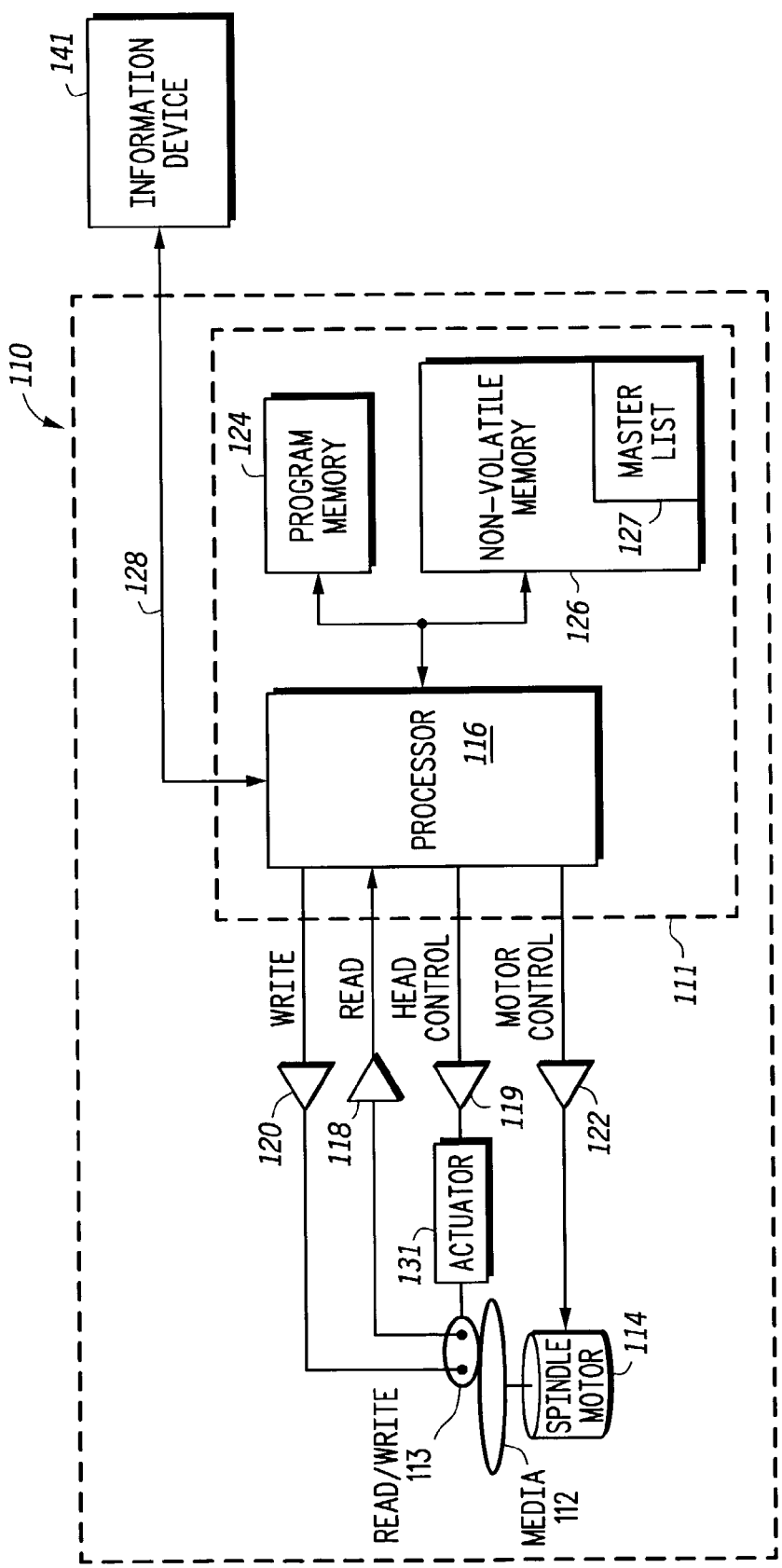
FIG. 1 is a block diagram of an embodiment of a data storage system according to the present invention.

FIG. 1 is a block diagram of a data storage system according to the present invention. In the embodiment shown, data storage system 110 includes a non IC based media 112 and circuitry for performing data accesses to media 112. Data storage system 110 is operably coupled via an I/O bus 128 to receive from information device 141, user data for storing on media 112 and to provide to information device 141, user data retrieved from media 112. User data is data used by information device 141. Examples of user data may include executable program files, database files, multimedia data files such as music, video, and pictures, information files such as word processing documents or spreadsheets, and computer operator profiles for information device 141. In one example, information device 141 is a personal computer system and data storage system 110 is a hard disk system (or sometimes referred to as a hard disk drive) mounted in a computer chassis (not shown) of the computer system. In such an example, bus 128 is a bus that conforms to a computer bus standard such as the IDE standard, Enhance IDE (EIDE) standard, or Small Computer System Interface (SCSI) standard. In other embodiments information device 141 may be e.g. a home media server, a personal video recorder, a cable or satellite set top boxes, a game console, an audio jukebox, a home security system, an automobile electronics, a personal digital assistant (PDA), a pager, a cell phone, an audio player, a central home communications hub, and a digital camera. In other embodiments, an information device can be a speaker, a display, headphones, microphones or other device that utilizes or provides user data stored in data storage system 110.

In the embodiment shown, media 112 includes a hard disk for storing user data. In other embodiments, media 112 may include multiple hard disks, or other types of memory such e.g. an optical disk, tape, magneto-optic storage device, or any other media that is used to store data, or a combination of the types of media listed above.

Data storage system 110 includes a control system 111. Control system 111 includes a processor 116 for controlling the operation of data storage system 110. Processor 116 is operably coupled to bus 128 to provide and receive user data from information device 141. Processor 116 provides via HEAD CONTROL signal line and amplifier 119, a head control signal to head actuator 131 to move a read/write head 113 to the appropriate track of media 112 for a data access. Processor 116 also provides a motor control signal via MOTOR CONTROL line and amplifier 122 to spindle motor 114 for maintaining motor 114 at a constant speed. Processor 116 provides data via a WRITE signal line and amplifier 120 to the read/write head 113 for writing the data to a specified sector. Processor 116 receives data from the read/write head 113 via the READ line and amplifier 118. Control system 111 includes a program memory 124 for storing program code that processor 116 executes to perform its operations. Those of skill in the art will appreciate that a data storage system may include other conventional circuitry and devices not shown in FIG. 1. Also, other types of data storage systems may be configured to implement the teachings herein.

Control system 111 includes a non-volatile memory 126 that is operably coupled to processor 116. In one embodiment, memory 126 is implemented in an IC based memory such as MRAM. MRAM is a non-volatile memory that stores data magnetically. With MRAM memory, the data stored in the MRAM is alterable during operation. With some MRAM, data in the memory may be programmed by voltages no greater than 5.5 volts. Most MRAM is programmed by voltages of less than 2 volts. Accordingly, the voltages required for powering the electronic components of control system 111 can be used to program memory 126. In one embodiment, memory 124 and 126 are implemented in the same integrated circuit. In other embodiments, memories 124 and 126 are implemented in the same memory array. In some embodiments, the portions of the array allocable to the program memory 124 and memory 126 may be variable during the operation of the storage system. In another embodiment, the master list may be stored at variable locations in memory 126. In one embodiment, processor 116, program memory 124, and memory 126 are implemented on a circuitry board (not shown) along with other electronic devices (not shown) of control system 111.

A master list 127 for hard disk 112 is "non-volatilely" stored in memory 126. A master list typically includes an entry for each file stored in storage media 112. Each entry includes the physical location on media 112 of the sector storing the first block of data for that file.

Figure 2:
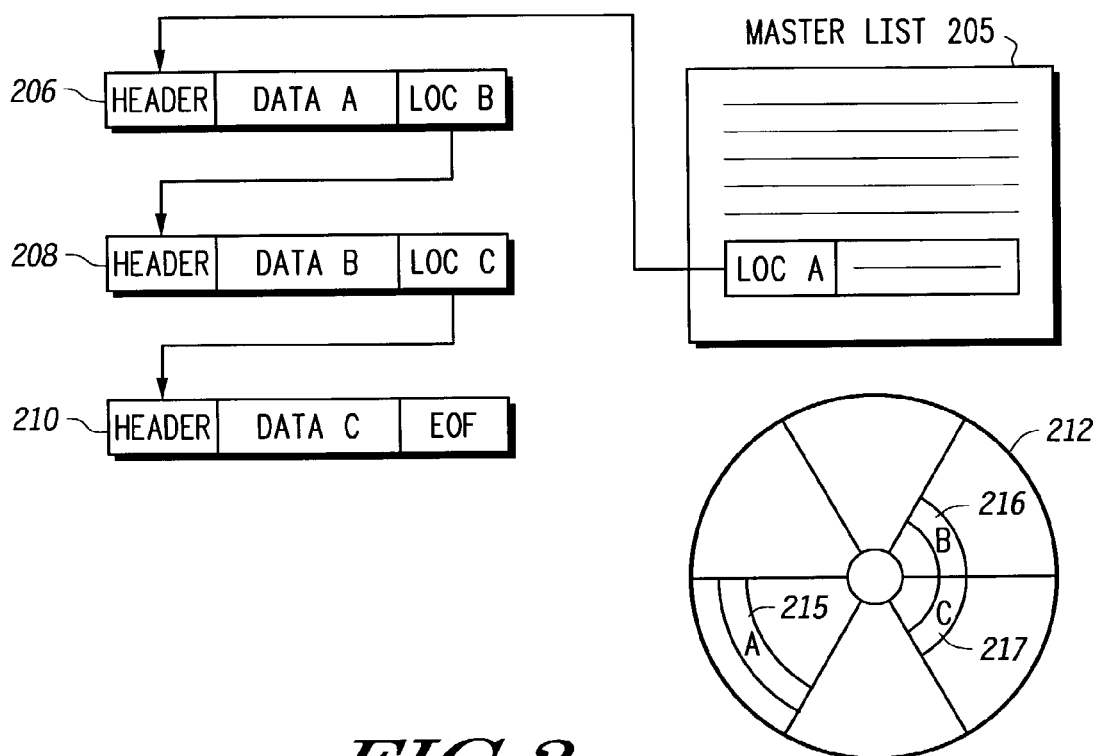
FIG. 2 is a symbolic representation showing a prior art implementation of a master list.

FIG. 2 is a symbolic representation of a master list and the top surface of a hard disk surface illustrating an example of how data is conventionally stored on a hard disk. In the embodiment of FIG. 2, a file is stored on hard disk surface 212 in three blocks of user data labeled DATA A, DATA B, and DATA C, stored at sector 215, sector 216, and sector 217, respectively of hard disk surface 212. Sector block 206 shows the data stored at sector 215, sector block 208 shows the data stored at sector 216, and sector block 210 shows the data stored at sector 217. Each sector block (206, 207, and 208) includes a header, a block of user data stored at that sector (e.g. sector block 206 includes block DATA A), and a tail portion that includes the physical location of the sector storing the next block of user data of the file. For example, the tail of sector block 206 includes the physical location of the sector 216 which stores block DATA B.

To retrieve a file stored on disk surface 212, a data storage processor (e.g. 116) first accesses master list 205 to get the physical location of the sector 215 storing the first block of user data (DATA A). The processor then accesses the data at sector 215 to obtain the user data at that location and the physical location of sector 216 (at which the next block of user data (DATA B) is stored). The physical location of sector 217 is located in the tail section of sector block 208, which is stored at sector 216. An end of file (EOF) marker is located in the tail section of sector block 210, which is stored at sector 217. The EOF marker indicates that sector block 210 includes the last portion of data of the file.

In conventional hard disk systems, the master list is stored in a sector (or more) of the hard disk. In order to access a file, the processor of a hard disk system accesses the master list on the hard disk to obtain the location of the first sector block of file data. When a new file is written to the hard disk, a new entry is created in the master list. The new entry includes the physical location of the sector storing the first block of data of the file.

Referring back to FIG. 1, because master list 127 of data storage system 110 is stored in an IC based non-volatile memory; the access time to the master list is significantly reduced in that hard disk 112 need not be accessed to access master list 127. Accordingly, the access time for a file can be reduced due to at least one less access to hard disk 112. Additionally. because master list 127 is non-volatilely stored in memory 126, the master list is automatically current even in the event of an emergency power down. Furthermore, the time for writing a new file to a disk is reduced in that the master list does not have to be retrieved from hard disk 112 and then written back to hard disk 112 with the entry for a new file.

In addition, typically in hard disk systems, the master list is stored on a sector of the hard disk surface. If the sector of the hard disk becomes corrupted, then the entire data storage system becomes unusable. With some non IC based memories (e.g. hard disk systems or tape drive systems), the chances of data stored in non IC based memory becoming corrupted is greater than that for data stored in IC based memories such as e.g. an MRAM memory. Consequently, using these more reliable memories may make the data storage system more reliable. Additionally, in some embodiments, a back up of the master list may be stored on a hard disk as well. With some of these embodiments, the back up of the master list may be stored at any location on hard disk 112. Also with these embodiments, processor 116 may compare the backup master list with the original list for errors.

Figure 3:
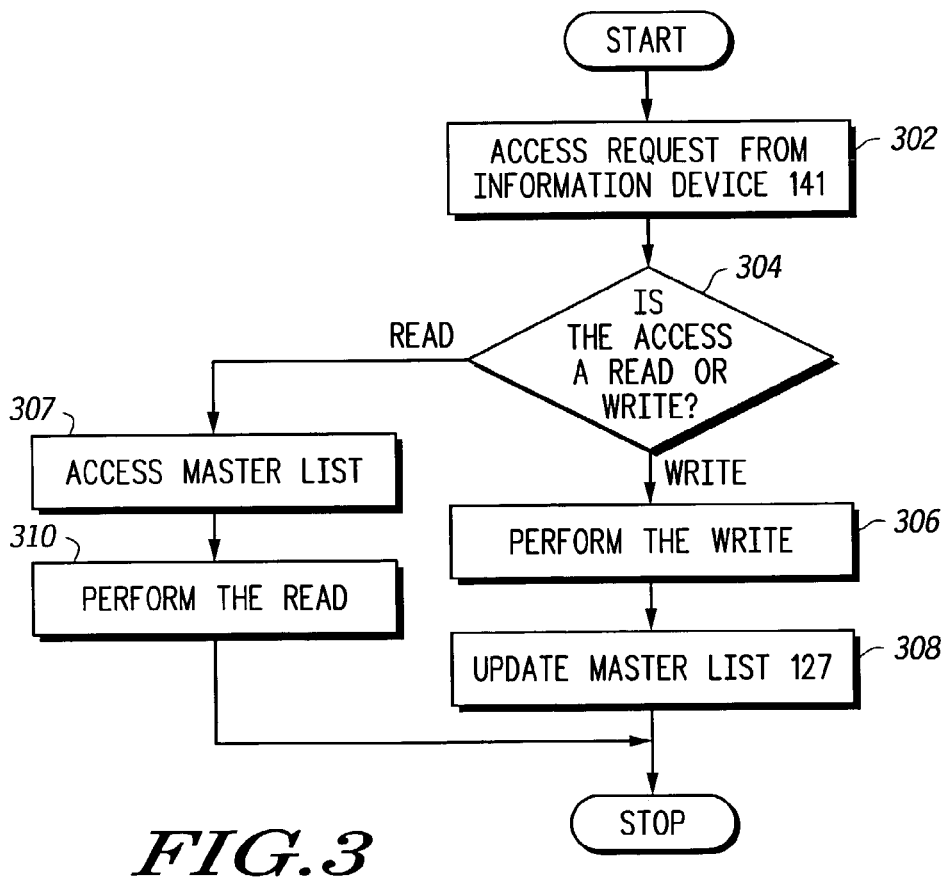
FIG. 3 is a flow diagram showing one embodiment of a data storage system performing a data access according to the present invention.

FIG. 3 is a flow diagram of one embodiment of a data access according to the present invention. The flow chart of FIG. 3 is performed by processor 116 executing code stored in program memory 124. In 302, processor 116 receives an access request from information device 141. In 304, processor 116 determines whether the access is a read access or a write access. If the access is a read access, processor 116 in 307 accesses master list 127 in memory 126 to find the location of the first sector storing data of the requested filed. In 310, processor 116 retrieves the file from the sectors of hard disk 112. If the access is determined to be a write access in 304, processor 116 performs the write access in 306 and updates master list 127 in 308.

In the example of FIG. 2, each entry of master list 205 includes the physical location on hard disk surface 212 of the first sector of hard disk surface 212 storing a block of data of the file associated with that entry. However, in some embodiments of the present invention, the master list may include other data and/or additional data for each file entry. For example, referring to FIG. 5, the entry 520 for each file in the master list includes the location of each sector storing a block of data of that file. See the discussion of FIG. 5 below.

In other embodiments, processor 116 may be configured to store other types of system data in memory 126. For example, memory 126 may store lists identifying defective sectors of media 112, lists of available sectors on media 112, lists identifying defective sectors and substitute sectors for the defective sectors (defective sector substitute lists), and list of copy protected sectors and/or data on media 112. Memory 126 may also be configured to store read/write channel parameters such as e.g. head gain and servo parameters such as e.g. torque constants. Memory 126 may store other types of system data depending upon the media type of media 112 and on how data is stored in media 112. Storing system data in a non-volatile IC based memory enables a data storage system processor to more quickly access the system data, thereby reducing the overall access time of user data by the data storage system.

Non-volatile memory 126 may also be used to store user data received from information device 141. Utilizing memory 126 to store user data may improve the performance, speed, and/or efficiency of the data storage system.

Figure 4:
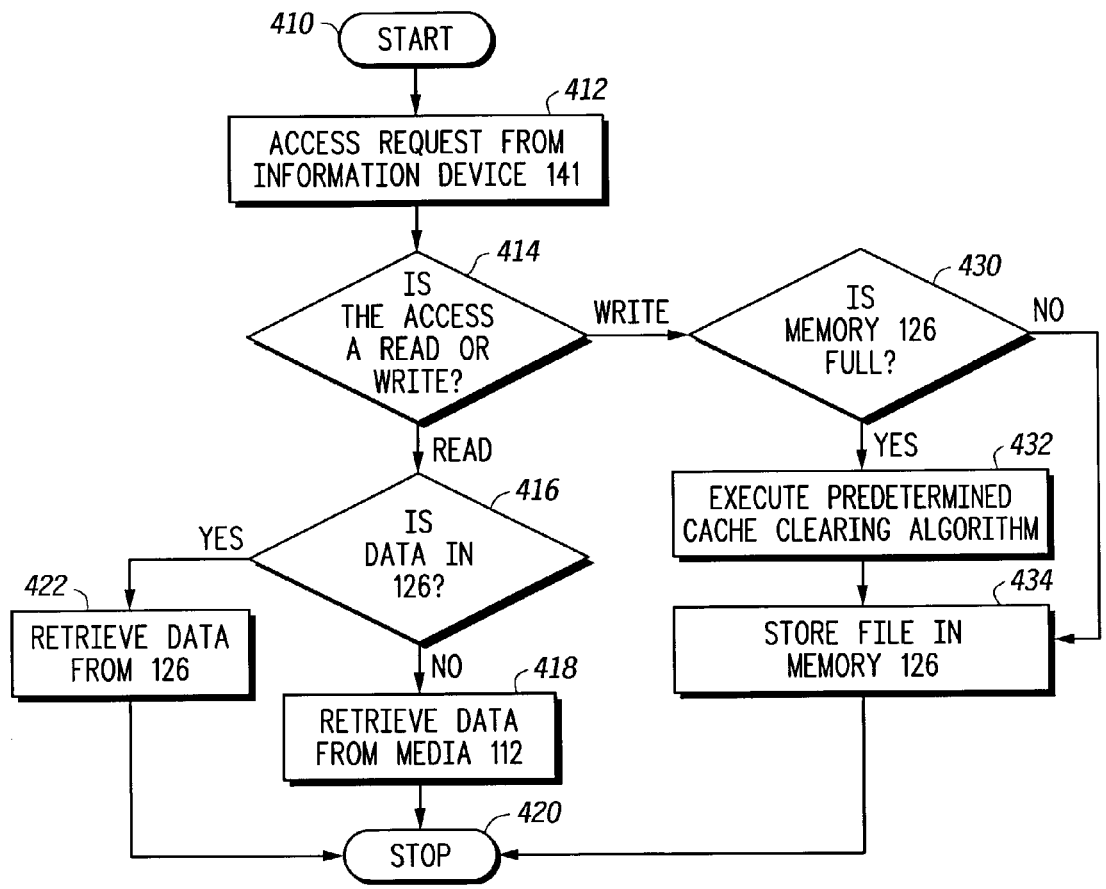
FIG. 4 is a flow diagram of one embodiment of a data storage system implementing a cache for storing user data from an information device.

FIG. 4 is a flow diagram of a method for handing data accesses where a portion of memory 126 is utilized to cache user data. In the embodiment of FIG. 4, a user data file received from information device 141 is stored in memory 126. Thus, if there is a later request for the file, the file stored in memory 126 can be provided to information device 141 in less time than if media 112 was accessed to obtain the data.

Referring to FIG. 4, processor 116 receives an access request from information device 141. If in 414, the access request is determined to be a write access, processor 116 checks to see if memory 126 is full in 430. If memory 126 is not full, then processor 116 writes in 434 the received data to memory 126. If in 430 memory 126 is determined to be full, then in 432 processor 116 executes a cache clearing algorithm to write a file currently stored in memory 126 to media 112 in order to make room in memory 126 for the received data. In 434, the data received from information device 141 is written to memory 126. In one example, the cache clearing algorithm involves removing the earliest written data in memory 126 to the media 112. In another embodiment, the cache clearing algorithm includes removing the data that was least recently used. Another cache clearing algorithm would be to remove a file or files of the same size as the data to be cached. Those of skill in the art will appreciate that, based upon the teachings herein, other cache clearing algorithms may be implemented.

If in 414, the access is determined to be a read access, processor 116 checks in 416 to see if the requested data is cached in memory 126. If the requested data is found in memory 126, then the requested data is retrieved from memory 126 in 422 and provided to information device 141. If the requested data is not found in memory 126 as determined in 416, the processor retrieves the requested data from media 112.

In another embodiment, processor 116 would determine that a file stored in media 112 has been frequently accessed within a predetermined time and would write that file to memory 126. Thus, the time needed to provide that file to information device 141 would be greatly reduced.

By caching user data in an IC based memory of the data storage system, the access time to provide that data to an information device is greatly reduced. Furthermore, by utilizing a non-volatile memory for caching the data, the data stored in memory 126 will be saved even in the event of a power loss. Thus, if there is a copy of a file stored in media 112 and in memory 126, the copy of the file in memory 126 would be the more recent copy, thereby eliminating the need to determine which of the copies is the more recent copy.

Furthermore, utilizing memory 126 as a cache for data writes enables data storage system 110 to execute a succeeding data access more quickly after a data write. With some conventional data storage systems, a data storage system can not process a data access after a data write, until the data of that data write is written to the non IC based media (e.g. hard disk). However, if a portion of memory 126 is utilized as a buffer for the data write, the data storage system 110 can execute a second data access immediately after the data write in that the data of the first data write is immediately written to the IC based memory 126. Because memory 126 is a non-volatile memory, the user data would remain in memory 126 even if power is removed from data storage system 110. Accordingly, in some embodiments, there is no urgency to write data stored in memory 126 to storage system 110, and thus, the data can be written to media 112 during periods of non access by information device 141.

In other embodiments, the data storage system would cache in memory 126 a number of data files received from information device 141, wherein processor 116 would perform a write burst to write the files to hard disk 112 at one time. Accordingly, the power consumed by the hard disk system 110 may be reduced in that the power required for a burst write of multiple files may be less than the power required for multiple single writes for each of the files.

In one embodiment, to implement a write buffering system set forth above into the flow chart of FIG. 4, a cache clearing algorithm as used in 432 would be configured to ensure that there is always adequate buffer space available in memory 126 for a data write. Thus, if an access is determined to be a data write in 414, processor 116 would immediately write the data to memory 126.

If the method of FIG. 4 is implemented in a data storage system that includes removable media (see e.g. 1512 of FIG. 15), the data stored in memory 1526 (see FIG. 15) would written to media 1512 in response to a request to remove the media.

Figure 5:
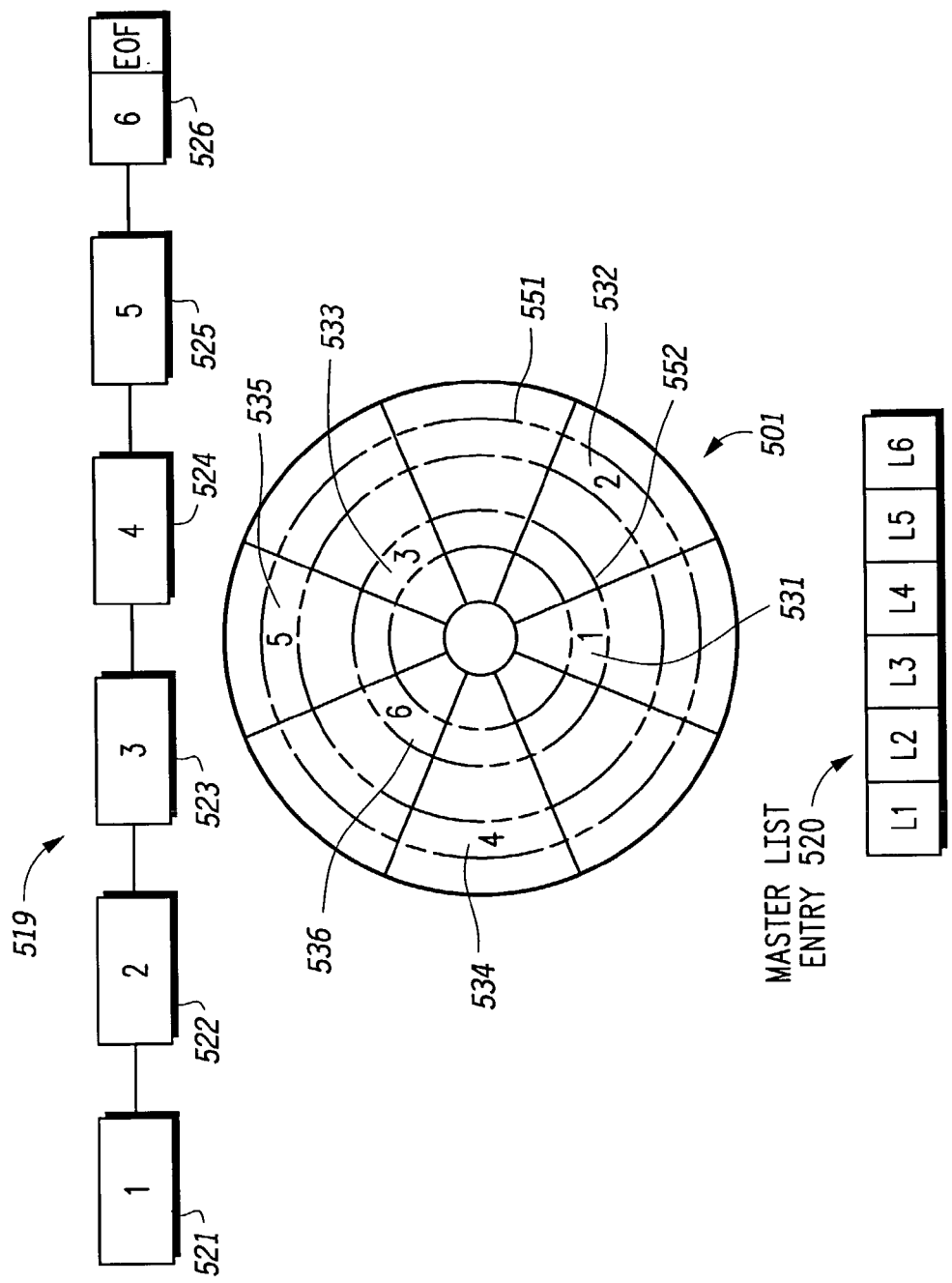
FIG. 5 is a symbolic diagram showing one embodiment of a system for optimized sector retrieval from a media according to the present invention.
Figure 6:
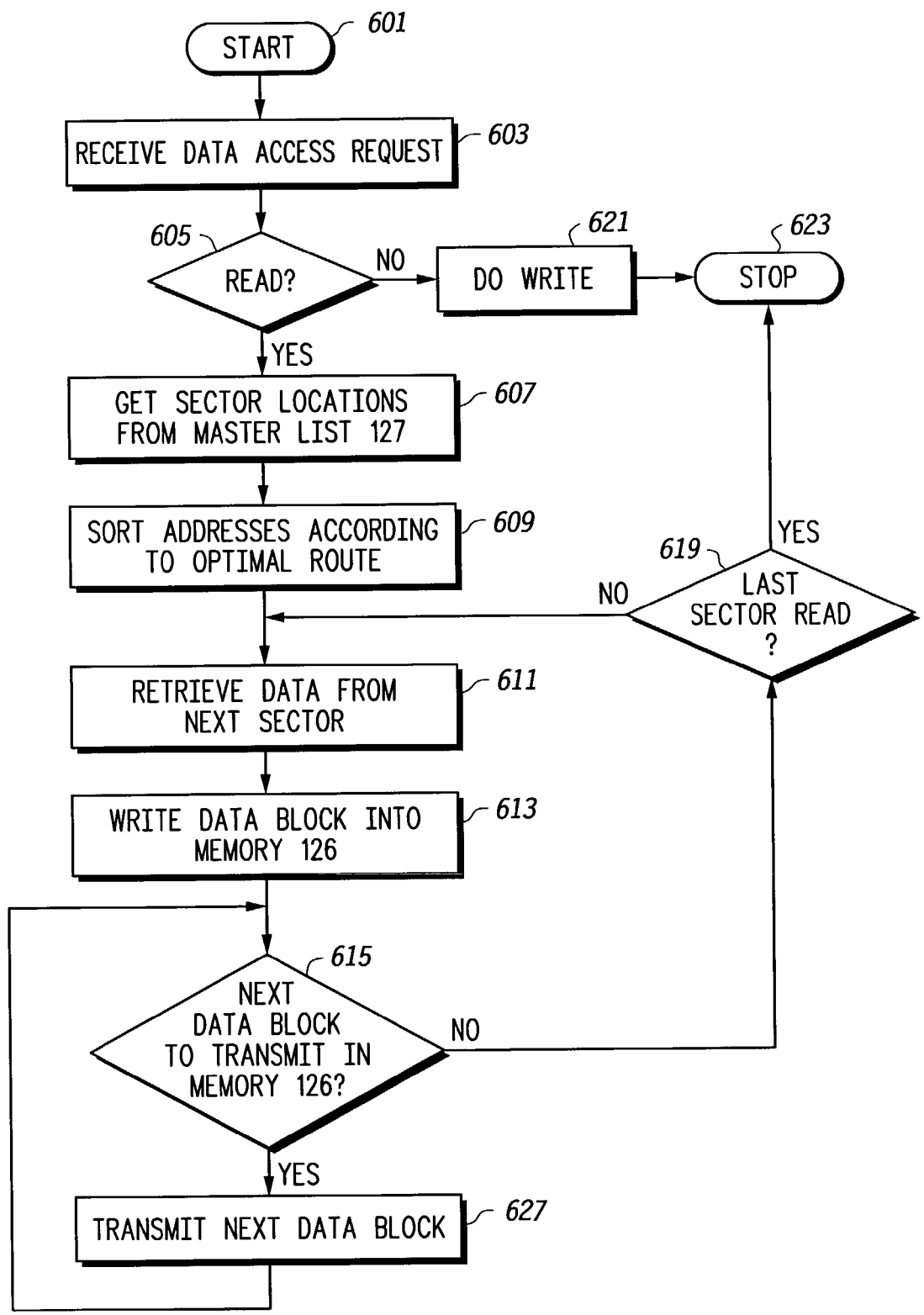
FIG. 6 is a flow diagram of one embodiment of optimized sector retrieval from a media according to the present invention.

Referring to FIGS. 5 and 6, data retrieved from media 112 in response to a read access request from information device 141 may also be buffered in memory 126 to decrease the time needed for the read access. Referring to FIG. 5, a file 519 of user data may be stored in a plurality of sectors (e.g. 531) of a hard disk surface 501. In the example of FIG. 5, file 519 includes 6 blocks of data (521, 522, 523, 524, 525,and 526), with each block being stored in a different sector of disk surface 501. For example, block 521 is stored in sector 531 of disk surface 501.

With some data storage systems, the blocks of data may be stored in non consecutive sectors of a disk surface requiring a read/write head (e.g. 113) of a data storage system to move back and forth between multiple tracks to retrieve the data. For example, sector 531 (which stores the first block of data 521 of file 519) is located in track 552 of a disk surface 501. Sector 532 (which stores the second block of data 522) is located in track 551. Sector 533 (which stores the third block of data 523) is located in track 551. Conventionally, to retrieve the data for this file, a read head (e.g. 113) would be required to move to track 552 to retrieve the first block 521 stored in sector 531, then move to track 551 to retrieve the second data block 522 stored in sector 532, and then move back to track 552 to retrieve the third data block 523 stored in sector 533. Consequently, the retrieval time under conventional methods may be lengthy due to the movement of a read head (e.g. 113) between tracks during a read access.

Embodiments of the present invention implement out of order data reads to optimize data retrieval time. In these embodiments, data may be retrieved in a nonsequential order and buffered in memory 126 before being provided to information device 141. Referring to FIG. 5, in these embodiments, each file entry (e.g. 520) of master list 127 includes the location of each sector (e.g. 531) of disk surface 501 that stores a block of data of the file associated with the file entry. For example, master list entry 520 includes the locations L1, L2, L3, L4, L5, and L6 of sectors 531, 532, 533, 534, 535, and 536, respectively. Including locations for each sector storing data of a file in a file entry of a master list may advantageously allow a system retrieve data in a non sequential order. Thus, reducing the time needed to retrieve a data file.

FIG. 6 is a flow diagram of one embodiment of a method for handling a data access by a data storage system that implements out of order data retrieval. In 603, when processor 116 receives a data access request for a file from information device 141 and determines that the requested access is a read in 605, processor 116 accesses the entry of master list 127 associated with the requested file to retrieve the locations of the sectors storing data for that file in 607. In this embodiment, each entry in master list 127 is similar to entry 520 of FIG. 5 in that it contains the location of every sector storing data of the file associated with the entry.

In 609, processor 116 sorts the locations (e.g. L1, L2) of the sectors (e.g. 531, 532) to determine an optimal route for retrieving the data in those sectors. The rules for determining a optimal route are dependent upon the operation of a data storage system in retrieving data. For example, with some conventional hard disk systems, it takes more time to move from track to track than to move to different sectors in a track. Accordingly, one scheme would be to retrieve all blocks of a file stored in sectors of one track before proceeding to the next track. With other conventional hard disk systems, the time need to rotate between sectors of a track is greater than the time to travel to a require track from a previous track. An optimal route would be determined accordingly.

Another factor in determining an optimal route may include the position of the read/write head (e.g. 113) on a hard disk when the read request is received. Another factor in determining an optimal route is the operation of a data storage system in transferring the requested data to an information device (e.g. 141). In one embodiment, the objective of an optimization scheme is to minimize the total time in providing requested data to an information device from the time that the data was requested by the information device In the embodiment of FIG. 5, if read/write head 113 is located on an outer track, the data storage system would first retrieve the data on track 551 (e.g. the data on sectors 532, 534, and 535) and then retrieve the data on track 552 (the data on sectors 531, 536, and 533). The particular order of data retrieved within a track would depend upon the location of the read/write head when entering the track. In one example, an optimal sector retrieval route would be an order of sectors 532, 534, 535, 531, 536, and 533.

Referring back to FIG. 6, after a determination of an optimal retrieval route in 609, processor 116 in 611 retrieves the data in the first sector of the route and buffers the data in memory 126 in 615. For the retrieval route set forth above, processor 116 first retrieves data block 522 in sector 532 and writes data block 522 into memory 126 (see FIG. 5). In 615, processor 116 determines whether the data in memory 126 includes the data block that is next to be transferred to information device 141. Because, at this time, memory 126 only includes the second data block 522 and because the first data block 521 has not been transferred to information device 141, processor 116 goes back to 611 to retrieve the data (block 524) from the next sector in the route (sector 534) and then proceeds to 613 to write data block 524 into memory 126. Because, the first data block 521 has not been retrieved, processor 116 returns to 611 until it retrieves block 521 from sector 531. At this time, data blocks 521, 522, 524, and 525 are stored in memory 126. Accordingly, in 615, processor 116 determines that the next data block (521) to be transferred to information device 141 is located in memory 126. In 627, data block 521 is transferred to information device 141. Processor 116 then goes back to 615 where it determines that the next data block to be transferred (data block 522) is buffered in memory 126 and accordingly, data block 522 is transferred in 627. Because, at this time, the next data block to be transferred is not in memory 126, processor 116 goes back to 611 to retrieve the next data block 526 from sector 536 and writes block 526 into memory 126 in 613. Because in 615, data block 523 (the next block to be transferred) is not in memory 126, processor 116 then goes back to 611 to retrieve block 523 from sector 533. Because block 523 is now in memory 126, processor 116 then transfers block 523 to information device 141. Because the remaining blocks 524, 525, and 526 are also in memory 126, processor 116 continues to loop through 615 and 627 wherein the remaining blocks are transferred to information device 141 in successive order. At 615, when no more data is left to be transferred, processor 116 goes to 619, where, because all of the blocks for the file have been retrieved, the operation ends in 623.

In other embodiments, a data storage system may utilize other types of out of order optimal retrieval methods. For example, processor 116 may be programmed to retrieve the first data block of a file e.g. 521 and then buffer all of the blocks located in sectors on the same track as the sector storing the first data block. The processor would then go to the track having the sector storing the next data block to be transferred (provided that that data block was not located in the track of the sector storing the first block) and retrieve and buffer all of the data blocks of that file that are stored in sectors of that track. Accordingly, under such a scheme, read/write head 113 would retrieve data from a track once per retrieval. Also in other embodiments, the data may be buffered in another types of memory such as e.g. DRAM or SRAM.

Providing a master list that includes the location of all sectors containing data of a file enables a data storage system in the embodiment of FIG. 6 to implement an out of order retrieval. Because, the locations of all of the files are known to the processor, the processor does not have to retrieve the data in successive order. In other embodiments, the master list may store other information to indicate the location of a sector storing data for a file. For example, in some embodiments, each sector location field of a file entry of a master list may include a consecutive number field indicating the number of consecutive sectors in a track from the sector associated with the sector location entry that contain consecutive blocks of data of a file. Thus, a data storage system processor (e.g. 116) could determine from the master list that a group of consecutive sectors includes blocks of data for a file. Accordingly, such a master list would contain only one sector location field per track for a group of consecutively ordered blocks located in consecutive sectors of the track.

In some embodiments, user data received from information device 141 can be non volatility stored in memory 126 in order to reduce the time of data retrievals and/or to "effectively" increase the capacity of the of the non IC based storage media.

Figure 7:
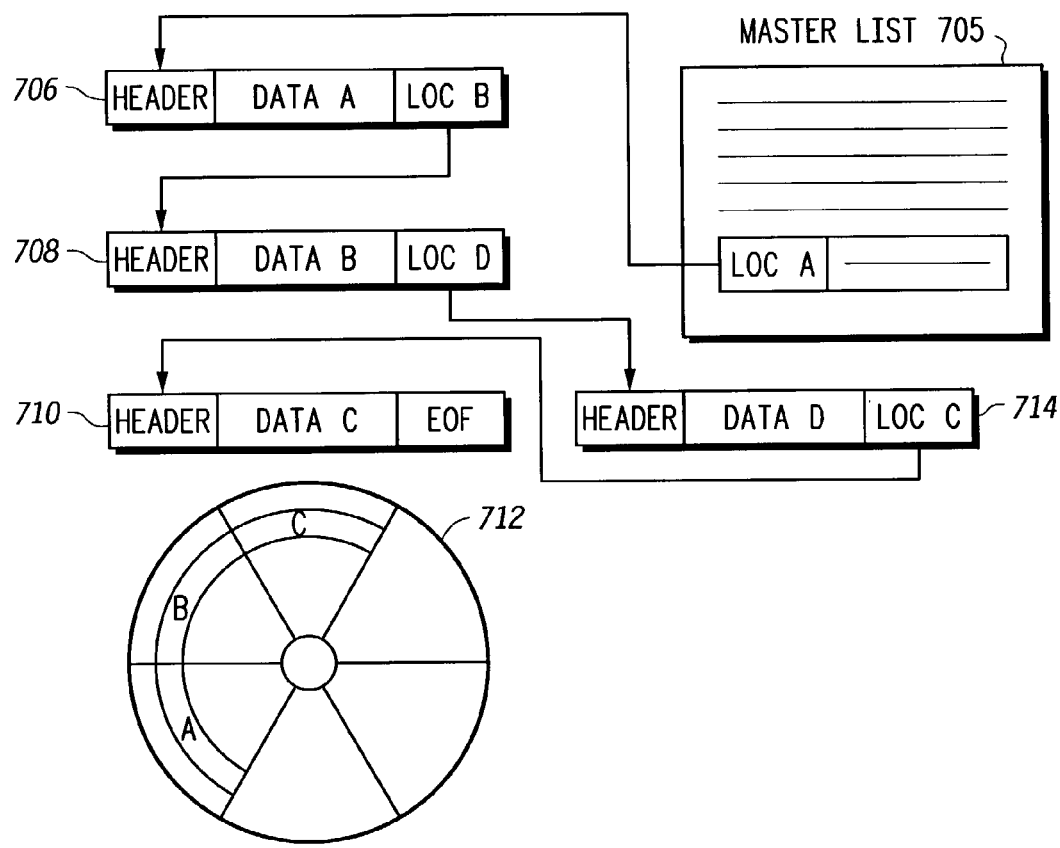
FIG. 7 is a symbolic representation of one embodiment of a data storage system utilizing a non-volatile IC based media for storing user data according to the present invention.

FIG. 7 shows a symbolic representation of an embodiment for utilizing memory 126 to non-volatilely store user data to in order to reduce the retrieval time of a file stored on hard disk surface 712. In this embodiment, memory 126 is used to non-volatilely store user data of a file that, if the file was completely stored on hard disk surface 712, would have a relatively long retrial time. For example, a file of user data initially consists of first data block DATA A stored in sector A of bard disk surface 712, a second data block DATA B stored in sector B of disk surface 712, and a third data block DATA C stored in sector C of disk surface 712. The retrieval time for the file consisting of the three data blocks DATA A, DATA B, and DATA C is relatively short in that the data blocks are stored in three consecutively ordered sectors A, B, and C. Sector blocks 706, 708, and 710 represent the data stored at sectors A, B, and C, respectively.

After the file (consisting of DATA A, DATA B, and DATA C) is initially stored on disk surface 712, information device 141 provides data storage system 110 with a revision to the file. The revision includes an additional data block DATA D (as shown in sector block 714). Because there is no other available sectors located on the same tract of disk surface 712 as sectors A, B, and C, storing DATA D on disk surface 712 would greatly increase the time for retrieving the file in that the retrieval of the file would involve moving the read head between two different tracks at least twice. However, in the embodiment of FIG. 7, sector block 714 is stored in memory 126, wherein the tail section of sector block 708 sets forth the location (LOC D) in memory 126 that data block DATA D is stored. The tail section of sector block 714 sets forth the location (LOC C) of sector C on disk surface 712 where data block DATA C is stored. Because DATA D is stored in the IC based memory 126, the time needed to retrieve the revised filed (consisting of data blocks A, B, C, and D) is about the same as the time needed to retrieve the original file (consisting of data blocks A, B, and C).

Memory 126 may be utilized in other ways to non-volatilely store user data to increase the speed of data retrieval or to increase the effective capacity of media 112. For example, if a file of user data is of a length where the last data block of a file is a few bytes, those few bytes may be stored in memory 126, as opposed to occupying an entire sector of media 112. In one embodiment, processor 116 would be programmed with a price per sector of media 112 and a price per byte of media 126. If the number of bytes of the end block of the file is small enough such the cost of storing the data in memory 126 is less than the cost of utilizing an entire sector of media 112, then processor 116 stores the last block in memory 126. In another embodiment, if only a middle block of a file is revised such that it exceeds the size to be stored on a sector, the portion of the revised data block exceeding the size of the sector may he stored in memory 126.

Figure 8:
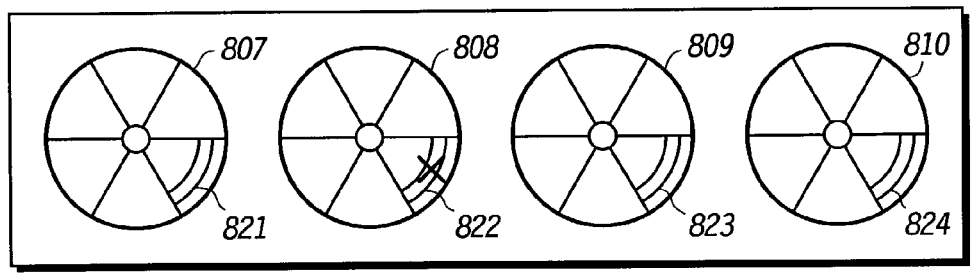
FIG. 8 is a symbolic representation of a data storage system implementing a non-volatile IC based media to store user data in conjunction with a redundant array of inexpensive disk (RAID) system according to the present invention.
Figure 9:
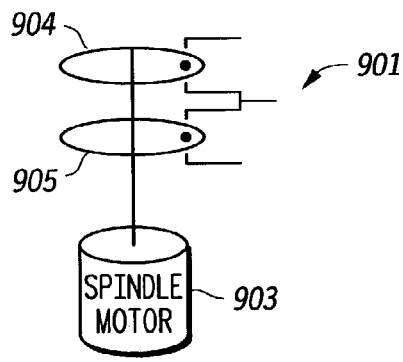
FIG. 9 is symbolic representation of a data storage system implementing a RAID.

In other embodiments, memory 126 may be utilized to store data that otherwise is to be stored in a sector that has been determined to be defective. One such example is with a data storage system implementing a redundant array of inexpensive disk (RAID) system. FIG. 9 is a representation of a portion of a hard disk system implementing a RAID system. Hard disk system 901 includes two hard disks 904 and 905 wherein information is stored on both sides of hard disks 904 and 905. FIG. 8 shows each side of hard disks 904 and 905 where hard disk surface 807 is located on the bottom side of hard disk 905, hard disk surface 808 is located on the top side of disk 905, hard disk surface 809 is located on the bottom surface of disk 904, and hard disk surface 810 is located on the top surface of hard disk 904.

Conventionally with a RAID system, user data is stored in blocks located on multiple hard disk surfaces. The drive circuitry of a storage system implementing the RAID system concurrently drives each of the surfaces together such that the read/write heads associated with each surface are positioned over the sector for each of the surfaces having the same sector location. The data blocks on each sector having the same sector location on each surface is read in parallel to obtain data of the file. This technique for storing data on multiple disk surfaces is sometimes referred to as data striping.

Referring to FIG. 8 and FIG. 9, because disks 904 and 905 are moved simultaneously to the same sector on each disk surface (e.g. 807), if one of the sectors is defective (e.g. sector 822 is defective as indicated by the "X" on surface 808), then the sectors of that sector location (e.g. 821, 822, 823, and 824) for all of the disk surfaces are considered unusable. Consequently, a defect in one sector of a sector location is multiplied by the number of disk surfaces operating in parallel.

In one embodiment in a system implementing data striping on multiple hard disk surfaces (such as e.g. with a RAID system), if one sector of a disk surface is determined to be defective, the data block that is intended to be written to that defective sector is instead stored in memory 126. The other data blocks are stored in the other sectors of the other disk surfaces having the same sector location as though there were no defective sectors at that sector location. For example, in FIG. 8, because sector 822 is defective, the data that is to be written to the sector is written instead to memory 126 wherein the other data blocks of the data stripe are written to sectors 821, 823, and 824 (the sectors of the hard disk surfaces 807, 809, and 810 that have the same sector location as sector 822). By utilizing memory 126 to store data intended to be written to a defective sector, the defective sector does not render unusable the other sectors having that sector location on other disk surfaces.

Figure 10:
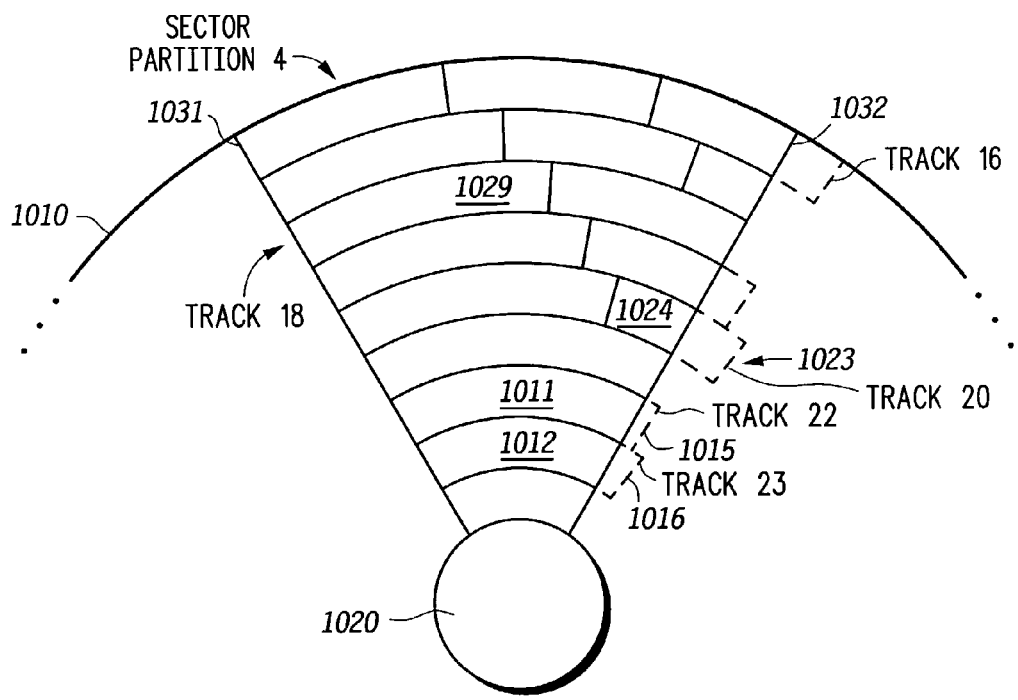
FIG. 10 is a top view of one embodiment of sector layout on a hard disk surface according to the present invention.

In other embodiments, a non-volatile, IC based memory may be utilized in a data storage system to increase the amount of data stored in the non IC based media of a data storage system. Referring to FIG. 10, for conventional hard disk surfaces (e.g. 1010), data is stored on sectors (e.g. 1029) in a sector partition (e.g. sector partition 4) located on tracks (e.g. track 18) that encircle a hub 1020 of the hard disk. The sectors are typically located between sector lines (e.g. 1031 and 1032), which define the sector partitions. In some embodiments, servo data may be stored on the sector lines (e.g. 1031 and 1032). Examples of servo data include the track number, the sector number, and analog data used to position read/write head 113 within a track. Conventionally, each sector is sized to hold a standard size block of data (e.g. 512 bytes in one example). With some examples, multiple sectors may be located in a track of a sector partition.

Because the sectors of conventional hard disks are located in tracks with each having a different radius with respect to the hub (e.g. 1020), portions of the tracks may be unusable in that disk surface space of a track in a sector partition is less than the required space needed to store a standard size block of data. For example, the amount of disk space in sector partition 4 (located between sector lines 1031 and 1032) in tracks 23 and 22 is less than what is needed to store a standard size block of data (e.g. 512 bytes). Space 1012 on track 23 of sector partition 4 is short the amount of space 1016 shown by the dashed lines located in track 23 immediately to the right side of sector line 1032, relative to the view shown in FIG. 10. The portions shown by the dashed lines immediately to the right side of sector line 1032 represent the amount of space that the disk surface space located immediately on the left side of sector line 1032 is deficient in storing a standard size block of data. For example, portion 1023 represents the amount of disk space that space 1024 of track 20 is deficient in storing a standard size block of data. Accordingly, with conventional systems, these spaces would not be utilized, resulting in wasted storage space on a disk surface.

Figure 11:
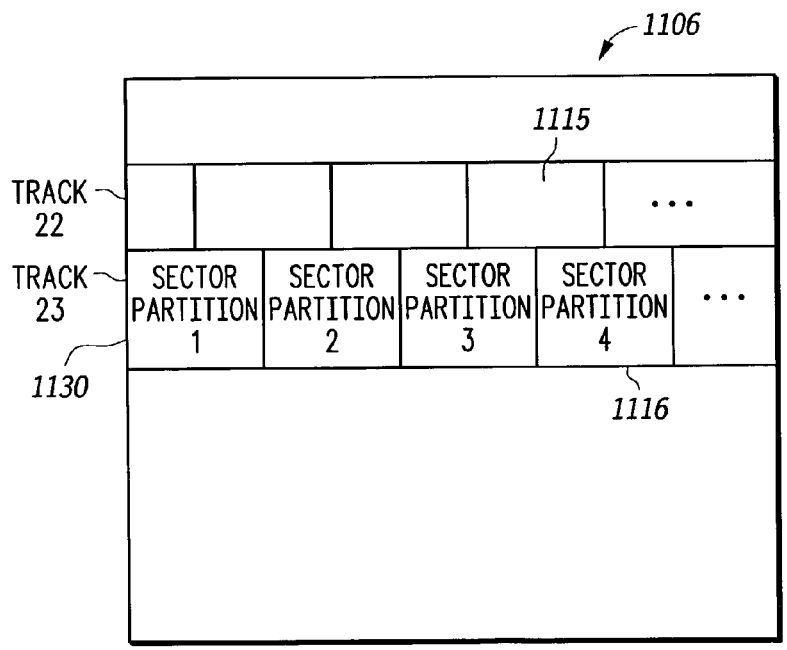
FIG. 11 is diagram of one embodiment showing the storage of a part of a block of user data in a non-volatile IC based media of a data storage system according to the present invention.

FIG. 11 is a representation of a portion of data stored in memory 126 according to some embodiments of the present invention. In some embodiments of the present invention, spaces of a hard disk surface that have less available storage space than what is needed to store a standard size block of data, can be used to store a portion of a standard size block of data, with the other portion of the standard size block of data being stored in memory 126. For example, a portion of a standard size block of data is stored in space 1012 of track 23 (see FIG. 10). The remaining portion of the standard size block of data (whose size is that of space 1016 in FIG. 10) is stored in memory 126 at location 1116. Memory 126 also stores the remaining portions of standard size blocks of data whose other portions are stored on hard disk surface 1010. For example, memory location 1115 of memory 126 stores the remaining portion (whose size is indicated by portion 1015) of a standard size block of data whose other portion is stored at location 1011 (see FIG. 10).

In some embodiments, the location in memory 126 associated with each deficient space on surface 1010 is reserved for that space. For example, block 1130 of memory 126 is reserved for storing the deficient portions for all disk spaces of all partition sectors of track 23. With some embodiments, the first portion of a block of data would be stored in memory 126 and the remaining portion would be stored on disk surface 1010. In one embodiment, a determination of whether to use memory 126 to store a portion of a standard size block of data would depend upon the cost of storing that portion in memory 126 versus the savings from the use of the space on the hard disk storing the other portion.

To retrieve a block of data in the embodiments of FIGS. 10 and 11, processor 116 would retrieve the portion of the data from the disk space (e.g. 1012) and the portion of the data stored in memory 126 (e.g. location 1116). See the discussion regarding FIG. 14. Processor 116 would combine the portions before providing them to information device 141. Because the remaining portion of the data is stored in an IC based memory (e.g. 126), the retrieval time for the block including the remaining portion is essentially the same as the retrieval time for a block that is entirely stored in a sector of a hard disk. Accordingly, storing portions of a standard-size block of data in an IC based, non-volatile memory may advantageously allow for better utilization of a hard disk surface.

Some conventional hard disk systems are configured such that a sector may be located on both sides of a sector line (e.g. 1031). With these systems, the hard disk system includes program code for extracting the data from a sector that crosses a sector line (e.g. the system includes code for removing the servo data that is stored in the sector line from the user data of the sector). Utilizing memory 126 to store portions of user data (e.g. as shown in FIGS. 10 and 11) may allow a system to be configured where no sectors cross sector lines, in that the remaining portion of a sector block is stored in memory 126. Accordingly, the program code described above would not be needed for such embodiments.

In some embodiments, in order to speed up the retrieval time of a file of user data stored in data storage system 110, a portion of the file can be written to the IC based memory 126 for non-volatile storage with the rest of the data being stored in non IC based media 112. With some of these embodiments, the decision as to which data is written to the IC based memory (e.g., 126) and which data is written to the non IC based media (e.g., 112) is dependent upon the retrieval times of the data stored in the non IC based media. With some of these embodiments, it is desired to reduce the overall retrieval time of a file as seen by the information device (e.g. 141) in retrieving the file from the data storage system (e.g. 110).

Figure 12:
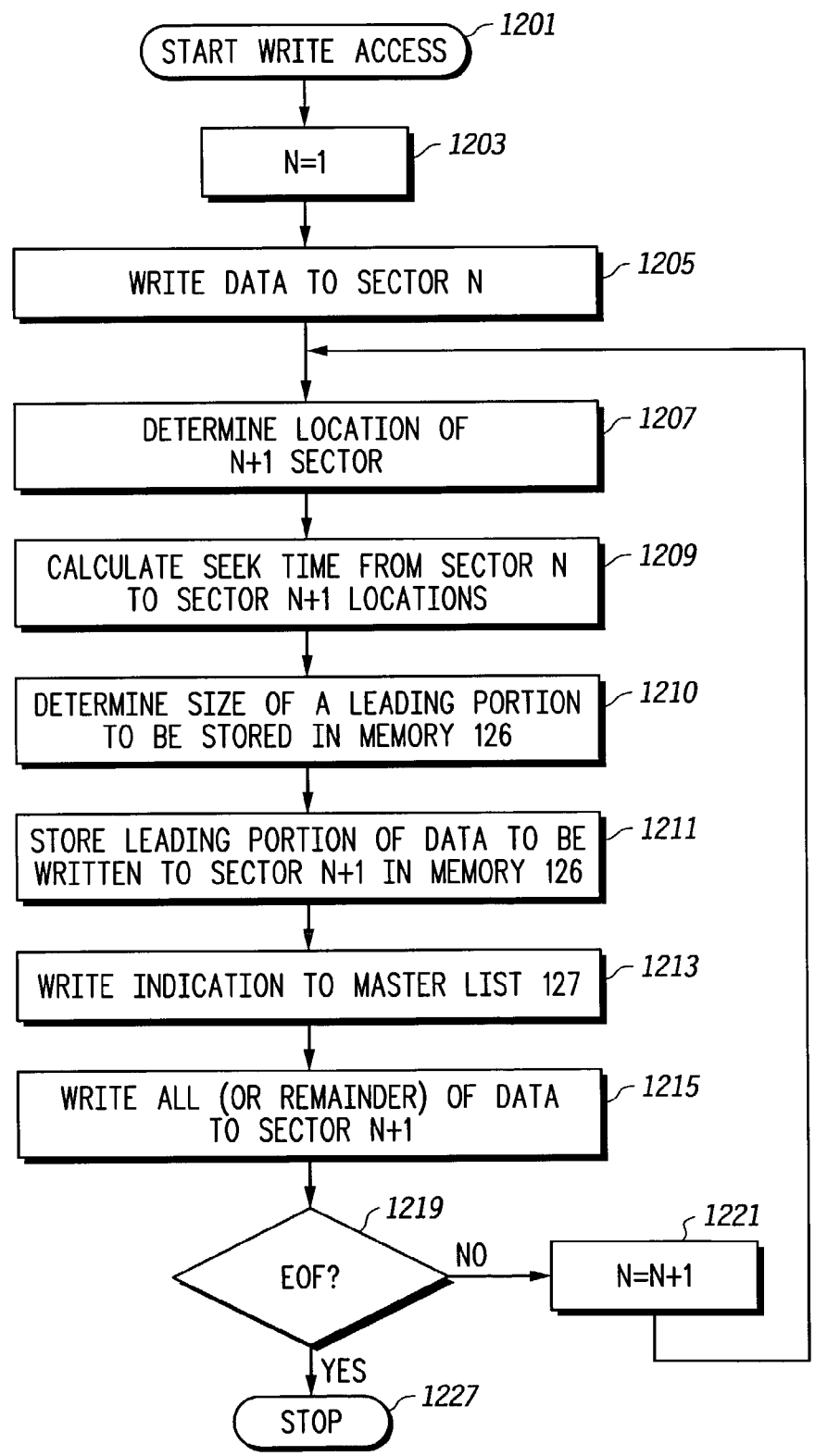
FIG. 12 is a flow diagram of one embodiment of a data write access according to the present invention.

FIG. 12 sets forth one embodiment of a write operation for implementing a system for non-volatilely storing portions of a file of user data in an IC based non-volatile memory so as to speed up the retrieval time of the file according to the present invention. In the embodiment of FIG. 12, a leading portion of the next data to be written to the non IC based media 112 is written to the IC based memory 126 so as to reduce the retrieval time of that data. The flow chart of FIG. 12 is implemented by the processor 116 of the data storage system 110.

In 1201, processor 116 begins to execute the method set forth in FIG. 12 in response to receiving a write access request from information device 141. Data storage system 110 stores a file of user data in blocks with each block being stored, in one embodiment, in a sector located on a disk surface of media 112. In one embodiment, the sectors used for storing a file are obtained from an unused sector list (not shown), stored in memory 126. In other embodiments, if the file to be written is a revision, the first sector is the first sector storing data of the previous version, as indicated by master list 127. In 1203, the sector number (N) is set to 1 and in 1205, the first block of data is written to Sector 1 on media 112 (the first sector obtained from the unused sector list).

In 1207, processor 116 determines the seek time to the next sector (N+1) from the first sector (N). The next sector is the next sector obtained from the unused sector list (for a new file) or the next sector that stores the next block of data of a previous version. The seek time is the time needed for read/write head 113 to travel from the end of the first sector (N) to the next sector (N+1). In the case where the next sector is the next consecutive in the same track as the previous sector (See for example disk surface 712 of FIG. 7 showing sectors A, B, and C in consecutive order on the same track), the seek time is relatively short. However, if the next sector (N+1) is located on a different track from the previous sector (N), then the seek time would be relatively long.

In 1210, processor 116 determines the size of the data to be stored in memory 126. The size the data to be stored in memory 126 is based on the seek time between the sector in which the data was previously written (N) and the next sector (N+1). If the next sector is the next consecutive sector in the track from the previous sector, processor 116 may determine in 1210 that no data needs to be stored in memory 126 due to the relatively short seek time. If however, the seek time is relatively longer, processor 116 would determine in 1210 the amount of data to be stored in memory 126.

The data that is stored in memory 126 is the leading portion of the data that is be stored in the next sector. Such data would include the header of the sector block of the next sector as well as the leading portion of the user data for the next sector. In 1211, the leading portion is written to memory 126. In 1213, processor 116 writes an indication to master list 127 (or other portion of memory 126) that a leading portion of the next block of data is located in memory 126.

In 1215, data is written to the next sector (N+1). In one embodiment, only the remaining portion (the portion not written to memory 126) of the next data block of user data (the data after the data block written to the previous sector (N)) is written to the next sector (N+1). Thus, for a system having a standard sector block size of 512 bytes, if the first 62 bytes were written to memory 126, then the remaining 450 bytes of a 512 byte block would be written to the next sector (N+1). In other embodiments, the next standard sector block size of data of a file would be written to the next sector (N+1). For example,. if 62 bytes of a file were written to memory 126, then the next 512 bytes of the file would be written to the next sector (N+1). In other embodiments, the entire next block size of data including the leading portion of data written to memory 126 is written to the next sector (N+1) (e.g. the next 512 bytes of data including the 62 bytes of data written to memory 126). With this embodiment, an entire copy of the file is stored in media 112. In some embodiments, the portion written memory 126 may be greater than the standard size block of data (e.g. 512 bytes). Still in other embodiments, if the seek time is greater than a predetermined threshold, then a standard size block of the next data (e.g. 50 bytes, 100 bytes, 512 bytes or 1024 bytes) is stored in memory 126. In embodiments where the data stored in the next sector block (N+1) is also stored in memory 126, processor 116 may skip a read of sector N+1 and go to sector N+2 during a read access.

In 1219, a determination is made whether all of the data of a file is stored in data storage system 110. If yes, then the process is ended. If no, N is incremented to N+1 in 1221 and processor 116 goes back to 1207 and repeats the method until all of the data of a file is stored. With the embodiments of FIG. 12, during a data access of the file, processor 116 can provide the leading portion data stored in memory 126 to information device 141 while the read/write head 113 is moving to the next sector.

Figure 13:
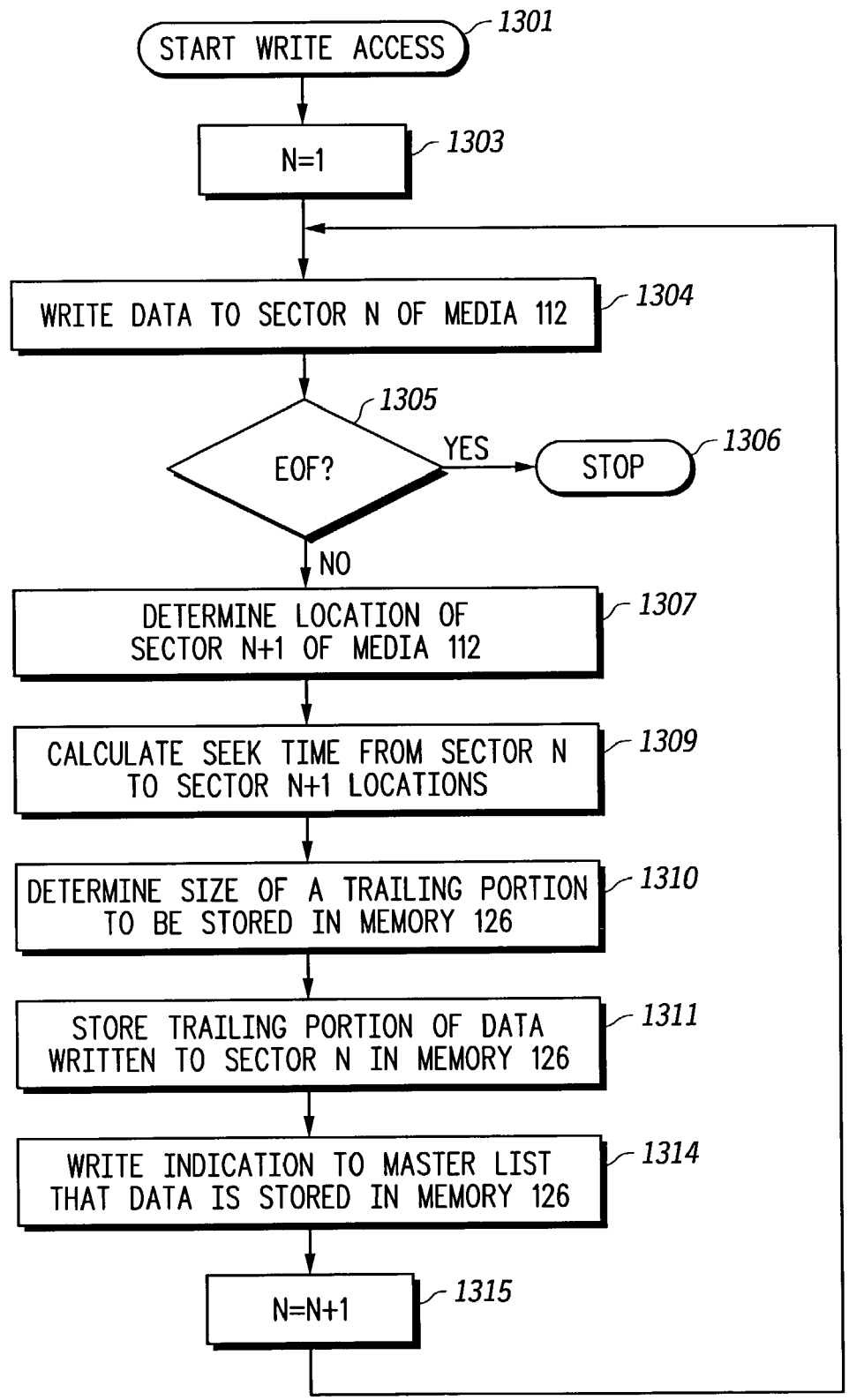
FIG. 13 is a flow diagram of another embodiment of a data write access according to the present invention

FIG. 13 sets forth another embodiment of a write operation for implementing a system for storing portions of a file of user data in an IC based non-volatile memory of a data storage system so as to speed up the retrieval time of the file according to the present invention. The embodiment of FIG. 13 is similar to the embodiment of FIG. 12 except that in the embodiment of FIG. 13, a trailing portion of the data written to a sector of the non IC based media 112 is written to the IC based memory 126. In this method, when there is a long seek time between two sectors, the read/write head (e.g. 113) can be moved from a first sector to the next sector prior to the completion of the reading of data stored in the first sector.

In 1301, processor 116 begins to execute the method set forth in FIG. 13 in response to receiving a write request from information device 141 to store a file of user data. In 1303, the sector number (N) is set to 1, and in 1304, the first block of data of the file is written to sector N (the first sector of media 112 designated for storing the file) on media 112. If the end of the file (EOF) has not been reached as determined in 1305, then in 1307, processor 116 determines the location of the next sector (N+1) designated for storing a file on media 112. In 1309, processor 116 calculates the seek time from current sector (N) (sector 1 during this loop of the method) to the next sector (N+1).

In 1310, processor 116 determines the size of the trailing portion (which is to be stored in memory 126) of the data written to the current sector (N) in 1304. The trailing portion is the last portion of the data that is to be written to a sector. In some embodiments, the trailing portion includes the location of the next sector. The size of the trailing portion to be stored in memory 126 is based on the seek time between the current sector (N) and the next sector (N+1). If the next sector (N+1) is the next consecutive sector in the track from the current sector (N), processor 116 may determine in 1310 that no data needs to be stored in memory 126 due to the relatively short seek time. If however, the seek time is relatively long, processor 116 would determine in 1310 the amount of data to be stored in memory 126. In some embodiments, a standard size of a trailing portion is stored in memory 126 if the seek time meets particular threshold. In some embodiments, the entire block of data written to sector N would be written to memory 112 if the seek time to sector N+1 is long enough. In embodiments where the entire sector block is stored in memory 126, processor 116 may control read/write head 113 to skip from sector N−1 to sector N+1.

In 1311, the trailing portion having a size determined in 1310 is stored in memory 126. In 1314, an indication that a trailing portion for that sector is written to master list 127. However, in some embodiments, the trailing portions of data are stored sequentially in memory 126 along with an indication of which sector block the particular trailing portion belongs. Thus, processor 116 can determine for which sector blocks a trailing portion in memory 126 is stored by reading the location in memory 126 that stores the trailing portions. In 1315, N is incremented by one wherein processor 116 goes back to 1304 to repeat the process.

In the embodiment of FIG. 13, all of the data of a file is written to a sector of media 112, including the data that is written to memory 126. However, in other embodiments, only the data of a file not written to memory 126 is written media 112.

To retrieve a file that is stored by the method of FIG. 13, if processor 116 determines that the trailing portion of a sector block is stored in memory 126, processor 116 will move read/write head 113 during a read of the sector storing the sector block after all of the data of the sector block that is not stored in memory 126 is read. Processor 116 then combines the tail portion data in memory 126 with the data read from the sector of media 112 and provides the data to information device 141. Because the tail portion of a sector block of data is stored in memory 126, read/write head 113 can be moved prior to the completion of a data read of the sector storing the sector block, thereby reducing the time needed to retrieve a file in storage system 110.

With other embodiments, the beginning part of a file may be stored in memory 126 and the remaining part of the file would be stored in media 112. Accordingly, when a request for a file is made, processor 116 can provide the beginning part of the file to information device 141 while moving read/write head 113 to retrieve the remaining portion of the data. In one example, a predetermined size of the beginning portion of a file (e.g. 100 bytes, 1000 bytes, or 20 data blocks) would be stored in memory 126. The size of the beginning portion would depend upon how long it takes a data storage system to retrieve data from media 112 in response to a read request.

Figure 14:
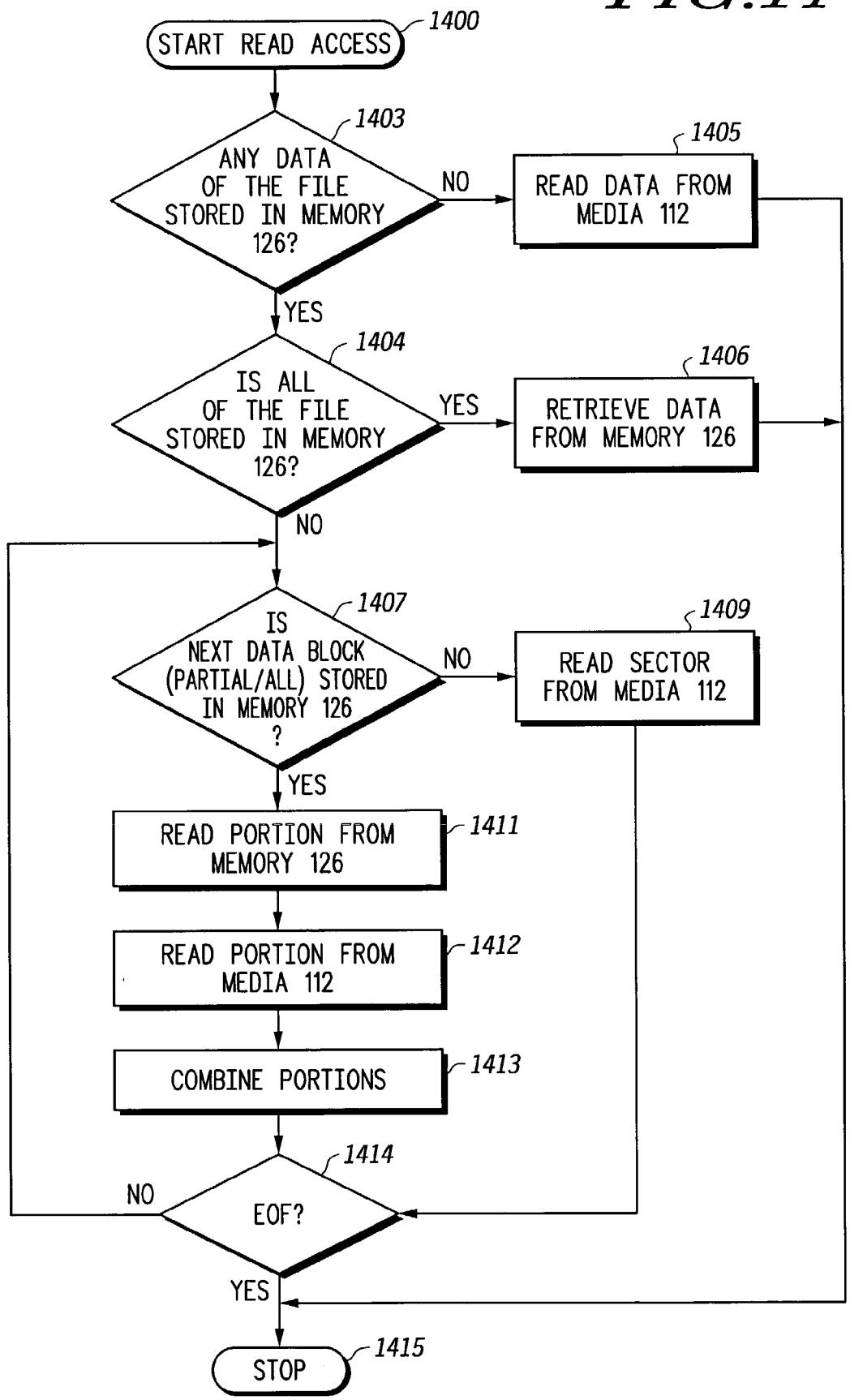
FIG. 14 is a flow diagram of one embodiment of a data read access according to the present invention.

FIG. 14 shows an embodiment of a read access operation of data stored in data storage system 110. The method set forth in FIG. 14 can be used, with modifications, to retrieve user data stored in both media 112 and memory 126, as for example, shown and described herein with regards to the embodiments of FIGS. 4, 7, 8, 9, 10, 11, 12, and 13 and described in the associated text to those Figures, as well as other embodiments not explicitly described herein.

In 1400, processor 116 begins to execute the method set forth in FIG. 14 in response to receiving a read request for a file from information device 141. In 1403, processor 116 determines whether any data of the file is stored memory 126. In some embodiments, an indication whether data of a file is stored in memory 126 is found in an entry for the file in master list 127. In other embodiments, memory 126 includes a cache list of files cached in memory 126 that would be accessed by processor 116 in response to a request for a file. If in 1403 no data is determined to be stored in 126, then the file would be retrieved from media 112. With some embodiments, no general indication that any data of a file is stored in memory 126. With these embodiments, an indication of whether data of a file is stored in memory 126 would be determined on a sector by sector basis. See, for example the embodiment of FIG. 7.

If yes in 1403, processor 116 determines whether all of the data of a file is stored in memory 126. If an entire file is stored in memory 126, then in 1406, processor 116 retrieves the file from memory 126. See, for example, the embodiment of FIG. 4 where all of the data of a file may be cached in memory 126. However, for those embodiments that would not store an entire file in memory 126, blocks 1404 and 1406 may be omitted.

If no in 1404, processor 116 determines in 1407 whether any of the first block of user data is stored in memory 126. If yes, processor 116 retrieves that portion of the block of data from memory 126 in 1411 and then retrieves the other portion (if any) of the block of data from a sector of media 112 in 1412. In 1413, processor 116 combines the portion retrieved from memory 126 and the portion retrieved from media 112. If the combined data block does not contain an end of file indication (EOF), then processor 116 goes back to 1407 until all of the data is obtained. If no in 1407, processor 116 obtains the data from the sector in media 112.

Those of skill in the art will appreciate, based upon the teachings herein, that the method of data retrieval set forth in FIG. 14 may be modified based upon how user data is stored in both media 112 and memory 126. For example, referring to the embodiment of FIG. 7, the decision of whether to access memory 126 or memory 112 for a block of data is made based upon the location information in the tail of a sector block (e.g. 706). In the embodiment of FIGS. 10 and 11 and also the embodiment of FIGS. 8 and 9, the decision of whether to access memory 126 is based upon the actual sector location on a disk surface in media 112. With the embodiment of FIGS. 10 and 11, part of the program of retrieving a data block from media 112 would include comparing the sector location with a table of sector locations (not shown) that includes the sector locations (e.g. 1012) with deficient spaces and the address in memory 126 (e.g. location 1116) where the remaining portion of the data for those sector blocks is stored. With the embodiment of FIGS. 8 and 9, processor 116 would access a table of defective sectors that includes the address in memory 126 storing the data block for each defective sector. Such tables may be stored in memory 126, program memory 124, or other memory (not shown) accessible by processor 116.

Figure 15:
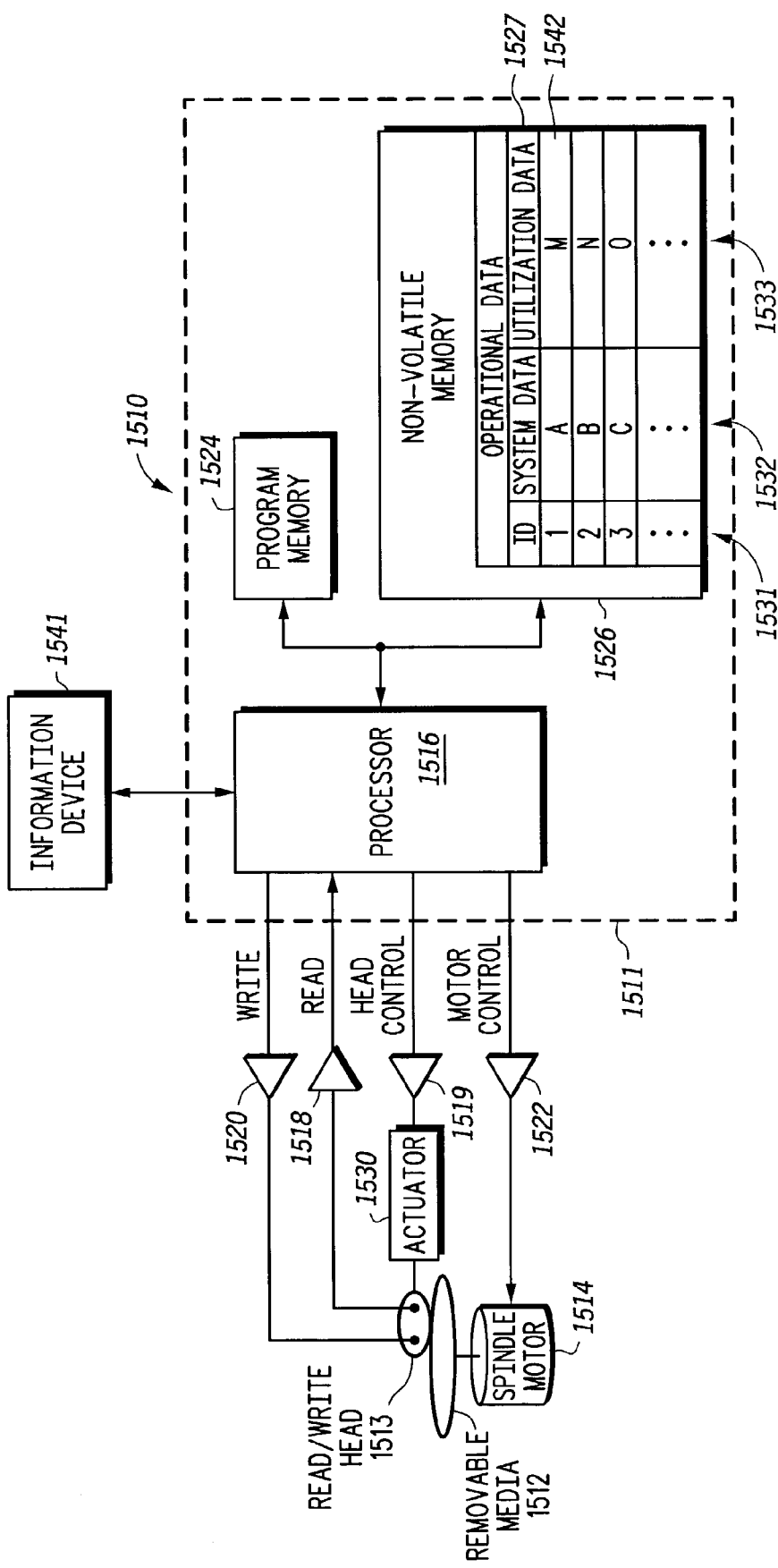
FIG. 15 is a block diagram of an embodiment of a removable media data storage system according to the present invention.

FIG. 15 is a block diagram of an embodiment of a removable media data storage system according to the present invention. Removable media data storage system 1510 retrieves (and in some embodiments writes) user data from removable media 1512, which is inserted into the data storage system, and provides the user data to information device 1541 (and in some embodiments receives user data from information device 1541 for storage). In one embodiment, data storage system 1510 is a compact disk (CD) drive, that can either be read only or read/write. In other embodiments, data storage system 1510 may be any one of e.g. a DVD player, a portable CD player, a CD ROM drive, a tape drive, a removable floppy disk drive, a system with removable hard disks, or any other storage system capable of receiving removable media. In general a removable media is any media that is designed to be removable from the removable media data storage system. In the embodiment shown, removable media is designed to be removed from data storage system 1510 including read/write head 1513 and spindle motor 1514, wherein an other removable media may be inserted in its place. However, in some embodiments, the removable media may include (and be removable with) other circuitry shown in FIG. 15 such as a read/write head or drive circuitry (e.g. spindle motor).

In the embodiment shown in FIG. 15, data storage system 1510 includes control circuitry 1511 for controlling the operation of storage system 1510. Control circuitry 1511 includes a processor 1516 and a program memory 1524 for storing code that is executed by processor 1516. Control circuitry 1511 also includes a non-volatile IC based memory 1526 for storing operational data regarding the removable media (e.g. 1512). In some embodiments, memory 1526 is implemented with a MRAM memory. In one embodiment, control circuitry 1511 is implemented on a circuit board (not shown) located in the housing (not shown) of data storage system 1510. In some embodiments, memory 1524 and memory 1526 are implemented in the same memory array.

In the embodiment of FIG. 15, memory 1526 includes a table 1527 that stores two types of operational data, system data (stored in system data fields 1532) and utilization data (stored in utilization data fields 1533), regarding each removable media. Examples of system data 1532 include master lists, defective sector lists, unused sector lists, defective sector substitute lists, copy protection features, or other similar types of system data that is specific for the type of removable media e.g. 1512. In other embodiments, memory 1526 may be configured to store only one of system data or utilization data for a removable media.

Utilization data is information regarding the use of a media in the storage of data. Examples of utilization data include e.g.: the number of times a media has been accessed, the number of times each file stored on a media has been accessed, the times that particular files on a media have been accessed, the last location in the media that was accessed, the number of times that any media has been accessed by system 1510, the user who requested the file, error checking and correction data regarding a file, and security data. For example, for a DVD player, a type of utilization data would be the last location of a disk that was being played before a user turned off the system.

In the embodiment of FIG. 15, table 1527 is configured to store system data (in fields 1532) and utilization data (in fields 1533) for a number of removable media that have previously been inserted into data storage system 15 10. Consequently, if a particular removable media is reinserted into data storage system 1510, processor 15 16 can access operational data regarding that media from table 1527. For example, if data storage system 1510 is a DVD player, table 1527 could be used to store the last location played of the last 20 DVDs played by the player. With such a system, a user could stop the player at a particular point in a movie and remove the media. Days later, a user could reinsert the media, wherein processor 1516 could access the utilization data of field 1533 to determine that last location where the movie was stopped. With such a system, the DVD player could provide the user with the option of resuming play from the location last stopped.

Each entry (e.g. 1542) of table 1527 includes an ID field 1531, which stores an identification indication of the removable media associated with the data in the entry. Each entry also includes a system data field 1532 (e.g. represented by "A" for entry 1542) in which system data associated with the removable media is stored and a utilization data field (e.g. represented by "M" for entry 1542) in which utilization data associated with the removal media is stored. Processor 1516 utilizes the ID field 1531 to determine if a media has been previously inserted into system 1510. If the media as been inserted, processor 1516 retrieves its operational data for that removable media from the entry associated with its ID.

Data storage system 1510 includes access circuitry for data accesses to removable media 1512. In the embodiment of FIG. 15, the access circuitry includes a read/write head 1513 for reading data from removable media 1512 and for writing (for system that can write to the removable media) data to removable media 1512. Read/write head 1513 is operably coupled to provide retrieved data from media 1512 to processor 1516 via a READ signal line and amplifier 1518 and to received data to be written to media 1512 via the WRITE signal line and amplifier 1520. Processor 1516 controls the movement of read/write head 1513 via a HEAD CONTROL signal line to actuator 1530. Processor 1516 also controls the rotation of the spindle motor 1514 with a signal sent via the MOTOR CONTROL line and amplifier 1522.

Figure 16:
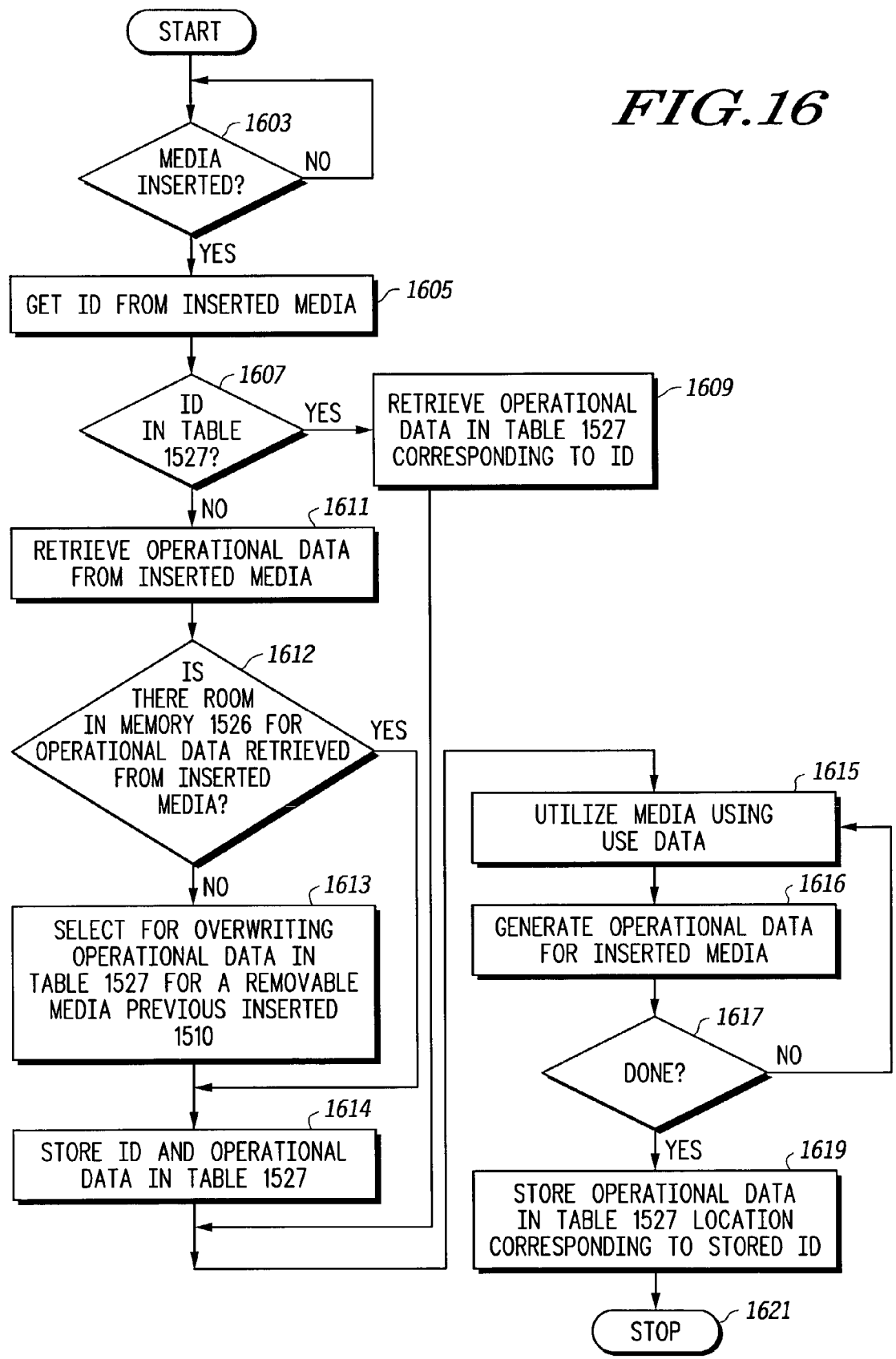
FIG. 16 is a flow diagram of an embodiment for utilizing operational data of a removable media by a data storage system according to the present invention.

FIG. 16 is a flow chart of one embodiment of a method for utilizing a removable media by data storage system 1510. In response to an indication that a removable media (e.g. 1512) has been inserted in 1603, processor 1516 in 1605 retrieves an identification indication (ID) from the removable media. In one embodiment, the ID is globally unique to the particular removable media. For example, if system 1510 were a hard disk drive, each removable hard disk would include a unique serial number or a number that is unique to the group of media such as e.g. a lot number. In other embodiments, the identification information would be unique as to the user data stored on the disk. For example, in one embodiment, the ID may be a movie title or music CD title or a UPC number for a music CD. In other embodiments, the ID may be a number added by a user.

In 1607, processor 1516 compares the ID from the inserted removable media with the IDs stored in field 1531 to determine if table 1527 includes operational data associated with the inserted removable media. If the ID of the inserted removable media is found in table 1527, processor 1516 retrieves the operational data stored in that entry in 1609. If the ID is not found in table 1527, then processor 1516 retrieves any operational data from the inserted removable media in 1512, such as e.g. master lists, defective sectors, and unused files. In one embodiment, such information may be found on a boot sector of a removable media.

In 1612, processor 1516 accesses table 1527 to determine whether there is enough room in table 1527 to store the operational data of the inserted removable media. In one embodiment, table 1527 is sized to hold the operational data of a predetermined number of removable media (e.g. 100) that have been inserted into data storage system 1510. If the operational data of a predetermined number of removable media is already stored in table 1527 of memory 1526, then in 1613 processor 1516 selects a table entry in table 1527 for overwriting with the ID and operational data of the inserted removable media. In one embodiment, processor 1516 selects the table entry for a removable media that has been used the least. In another embodiment, processor 1516 overwrites the table entry for the removable media that has been the least recently used. Still in other embodiments, the table entry designated for overwriting would be chosen based on various criteria including both frequency of insertion and order of insertion of removable media. After 1613 or if yes in 1612, processor 1516 in 1614 stores the ID and operational data for the inserted media in table 1527 of memory 1526.

In 1615, data storage system 1510 operates using the operational data that was stored in table 1527. In one embodiment, the operational data includes a master list which processor 1516 accesses for data accesses of files stored in the inserted removable media. See the previous discussions in this application regarding master lists for the embodiments of data storage system 110 of FIG. 1. Also, as with the discussions regarding data storage system 110, system data may include defective sector lists, unused sectors lists, defective sector substitute lists, copy protection features, or any other data that is used by the processor 1516 to access user data on the inserted removable media. Those of skill in the art will recognize, based on the teachings herein, that the type of system data that is stored in table 1527 may depend upon how user data is stored in the removable media. For example, for a CD storing songs, the master list may include on which tracks certain songs are stored.

An advantage of storing system data in a non-volatile IC based memory of a removable media data storage system is that it may allow the data storage system to more quickly retrieve data from the removable media. Furthermore, because the memory is non-volatile, operational data for multiple removable media may be stored in table 1527 and be available after a power down operation. Consequently, one advantage that may occur with such a system is that the time needed to access the data may be reduced in that once processor 1516 recognizes the ID of the removable media, processor 1516 may begin the access of user data from the removable media without having to load system data for the removable media.

Another advantage that may occur from including a master list in memory 1526 is that it may reduce the number of accesses to the removable media for data writes. Typically, with some removable media that are writeable, every write access to the removable media requires that the master list on the removable media be updated. However with some embodiments of data storage system 1510, because the master list may be stored in memory 1526, the master list stored on media 1512 would not necessarily have to be updated for every write. In one embodiment, the master list on removable media 1512 would be updated only when removable media 1512 is to be removed from system 1510.

In 1616, processor 1516 generates operational data during the operation of data storage system 1510 and stores that data in table 1527 of memory 1526. For example, processor 1516 may store in the utilization field 1533 of the table entry (e.g. 1542) for the removable media, the number of times a file (e.g. a song, movie, executable file) stored on media 1512 is accessed. In one embodiment, this information may be provided upon request to information device 1541. In another embodiment, the operational data may be used to cache into memory 1526, the most accessed file from media 1512 to reduce the access time in providing that file to information device 1541. Other types of utilization data generated in 1616 includes the number of times the file has been utilized.

When media 1512 is determined to be removed from data storage system 1510 in 1617, processor 1516 stores operational data regarding the end of use of removable media 1512 in table 1527. In one embodiment, data storage system 1510 includes a sensor (not shown) for sensing when an inserted removable media (e.g. 1512) is removed from data storage system 1510. Examples of such end of use operational data include the last file accessed, the last time accessed, the fact that the file was accessed, and the fact that the removable media was inserted, the time of use of the system, a user who accessed the data.

Those of skill in the art will appreciate that, based upon the teachings herein, memory 1526 may be utilized in ways similar to those describe herein with respect to memory 126. For example, referring to FIG. 4, memory 1526 may be utilized to cache the most recently accessed or most often accessed file stored in removable media 1512. Thus, the access time for that file may be greatly reduced in that media 1512 does not have to be accessed to retrieve a well-used file. In addition, if media 1512 is written to, then the writes to media 1512 may be cached in memory 1526, thereby allowing an immediately subsequent data access. In such embodiments, if there is a request to remove the media, then all data in memory 1526 that is not already in media 1512 could be written to media 1512 before removal.

Furthermore, features described with respect to the embodiments of removable data storage system 1510 may also be implemented by embodiments of data storage system 110. For example, data storage system 110 may be configured to store utilization data in memory 126. For example, data storage system 110 may be configured to store the number of times a file stored in media 112 is accessed and/or revised.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A removable media storage system comprising:

access circuitry for reading user data from a removable media when the removable media is coupled to the removable media storage system;

a non-volatile integrated circuit-based memory, the non-volatile integrated circuit-based memory is configured to store operational data associated with the removable media that has been coupled to the removable media storage system;

wherein the non-volatile integrated circuit-based memory is configured to store operational data associated with a plurality of removable media;

wherein the operational data further comprises at least one of a master list, a list of defective sectors associated with the plurality of removable media and a list of unused storage sectors associated with the plurality of removable media;

wherein the non-volatile integrated circuit-based memory includes a magnetoresistive random access memory (MRAM) having a programming voltage that has a magnitude of no greater than 5.5 volts.

2. The removable media storage system of claim 1 wherein operational data further includes system data.

3. The removable media storage system of claim 1 wherein the operational data further includes utilization data.

4. The removable media storage system of claim 3 wherein the utilization data further comprises information describing one or more storage locations in the removable media where accesses have occurred.

5. The removable media storage system of claim 3 wherein the utilization data further includes a last accessed location on the removable media.

6. The removable media storage system of claim 1 wherein the non-volatile integrated circuit-based memory is configured to store a unique identifier for identifying each of the plurality of removable media.

7. The removable media storage system of claim 1 wherein the operational data further comprises at least one of how many times each of the plurality of removable media has been accessed.

8. A removable media storage system comprising:

access circuitry for reading user data from a removable media when the removable media is coupled to the removable media storage system;

a non-volatile integrated circuit-based memory, the non-volatile integrated circuit-based memory is configured to store operational data associated with the removable media that has been coupled to the removable media storage system;

wherein the operational data further includes utilization data;

wherein the utilization data further includes information describing a number of times the removable media is accessed by the removable media storage system;

wherein the non-volatile integrated circuit-based memory is configured to store operational data associated with a plurality of removable media;

wherein the operational data further comprises at least one of a master list, a list of defective sectors associated with the plurality of removable media and a list of unused storage sectors associated with the plurality of removable media;

wherein the non-volatile integrated circuit-based memory includes a magnetoresistive random access memory (MRAM) having a programming voltage that has a magnitude of no greater than 5.5 volts.

9. A method of storing information in a removable media storage system comprising:

reading user data from a removable media where the removable media is coupled to the removable media storage system;

storing operational data associated with the removable media in a non-volatile integrated circuit-based memory of to removable media storage system;

coupling the removable media to the removable media storage system;

prior to reading the user data from the removable media, determining whether a media identification number stored in the non-volatile integrated circuit-based memory matches an identifier associated with the removable media; and if there is no match, determining if there is available space to store operational data of the removable media in the non-volatile integrated circuit-based memory and writing the operational data in the available space, and if there is not sufficient space, using a predetermined method to select operational data of the non-volatile integrated circuit-based memory of a previously coupled removable media for overwriting with the operational data of the removable media.

10. The method of claim 9 further comprising:

maintaining the operational data in the non-volatile integrated circuit-based memory for subsequent use after power to the removable media storage system is removed.

11. The method of claim 9 further comprising:

maintaining the operational data in the non-volatile integrated circuit-based memory for subsequent use after the removable media is removed from the removable media storage system.

12. The method of claim 9 further comprising the non-volatile integrated circuit-based memory includes a magnetoresistive random access memory (MRAM).

13. The method of claim 9 further comprising programming the non-volatile integrated circuit-based memory with a programming voltage that is no greater than 5.5 volts.

14. The method of claim 9 wherein the operational data includes:

utilization data that provides operating details associated with accessing a removable media to obtain user data.

15. The method of claim 9 wherein operational data includes a last accessed location on the removable media.

16. A removable media storage system comprising:

removable media access circuitry, the removable media access circuitry configured to read user information from a removable media when the removable media is coupled to the removable media storage system for accessing user data on the removable media;

a non-volatile integrated circuit-based memory, the non-volatile integrated circuit-based memory storing operational data associated with a removable media that has been coupled to the system;

wherein the non-volatile integrated circuit-based memory is configured to store operational data associated with a plurality of removable media;

wherein the operational data further comprises at least one of how many times each of the plurality of removable media has been accessed;

wherein the non-volatile integrated circuit-based memory is a magnetoresistive random access memory (MRAM) that stores a media identification number for potential matching with an identifier associated with the removable media;

wherein the magnetoresistive random access memory (MRAM) has a programming voltage that has a magnitude of no greater than 5.5 volts.

* * * * *